(12) United States Patent
Campos, II et al.

(10) Patent No.: US 9,420,848 B2
(45) Date of Patent: Aug. 23, 2016

(54) ARTICLE OF FOOTWEAR INCORPORATING A CHAMBER SYSTEM AND METHODS FOR MANUFACTURING THE CHAMBER SYSTEM

(71) Applicant: NIKE, Inc., Beaverton, OR (US)

(72) Inventors: Fidencio Campos, II, Dallas, OR (US); Zachary M. Elder, Portland, OR (US); Benjamin J. Monfils, Beaverton, OR (US); Lee D. Peyton, Tigard, OR (US)

(73) Assignee: NIKE, Inc., Beaverton, OR (US)

( * ) Notice: Subject to any disclaimer, the term of this patent is extended or adjusted under 35 U.S.C. 154(b) by 679 days.

(21) Appl. No.: 13/773,360

(22) Filed: Feb. 21, 2013

(65) Prior Publication Data

US 2014/0230276 A1 Aug. 21, 2014

(51) Int. Cl.
*A43B 13/20* (2006.01)
*B29D 35/12* (2010.01)

(52) U.S. Cl.
CPC ............... *A43B 13/20* (2013.01); *A43B 13/206* (2013.01); *B29D 35/122* (2013.01); *B29D 35/128* (2013.01)

(58) Field of Classification Search
CPC ..... A43B 13/20; A43B 13/203; A43B 13/206
USPC .................................................. 36/29, 35 B
See application file for complete search history.

(56) References Cited

U.S. PATENT DOCUMENTS

| 2,128,134 | A |   | 8/1938  | Giusto       |              |
|-----------|---|---|---------|--------------|--------------|
| 3,251,144 | A |   | 5/1966  | Weitzner     |              |
| 3,719,965 | A | * | 3/1973  | Chevallereau | A43B 13/04   |
|           |   |   |         |              | 12/146 B     |
| 4,635,384 | A | * | 1/1987  | Huh          | A43B 13/20   |
|           |   |   |         |              | 36/28        |
| 4,817,304 | A |   | 4/1989  | Parker et al.|              |
| 5,005,299 | A |   | 4/1991  | Whatley      |              |
| 5,010,662 | A |   | 4/1991  | Dabuzhsky et al. |          |
| 5,083,361 | A |   | 1/1992  | Rudy         |              |
| 5,245,766 | A |   | 9/1993  | Warren       |              |
| 5,425,184 | A |   | 6/1995  | Lyden et al. |              |
| 5,440,826 | A |   | 8/1995  | Whatley      |              |
| 5,543,194 | A |   | 8/1996  | Rudy         |              |
| 5,595,004 | A | * | 1/1997  | Lyden        | A43B 13/20   |
|           |   |   |         |              | 36/153       |
| D391,750  | S |   | 3/1998  | Santos et al.|              |
| D391,751  | S |   | 3/1998  | Santos et al.|              |
| 5,755,001 | A |   | 5/1998  | Potter et al.|              |
| D395,744  | S |   | 7/1998  | Edington et al. |           |
| 5,830,553 | A |   | 11/1998 | Huang        |              |
| 5,987,780 | A |   | 11/1999 | Lyden et al. |              |
| 5,993,585 | A | * | 11/1999 | Goodwin      | A43B 7/144   |
|           |   |   |         |              | 156/145      |

(Continued)

OTHER PUBLICATIONS

International Search Report and Written Opinion for International Application No. PCT/US2014/017310, mailed Jul. 22, 2014.

*Primary Examiner* — Ted Kavanaugh
(74) *Attorney, Agent, or Firm* — Honigman Miller Schwartz and Cohn LLP; Matthew H. Szalach; Jonathan P. O'Brien

(57) ABSTRACT

An article of footwear has an upper and a sole structure secured to the upper. The sole structure may include a component with a flange extending in an outward direction from a void within a chamber of the component. A sole may also include a chamber formed from a polymer material and including a plurality of subchambers, each of the subchambers having at least one segment with a width that is less than fourteen millimeters. A sole may further include a chamber having areas with different thicknesses, and an outsole bonded to areas with a lesser thickness.

19 Claims, 38 Drawing Sheets

(56) References Cited

U.S. PATENT DOCUMENTS

| | | | |
|---|---|---|---|
| 6,009,637 A * | 1/2000 | Pavone | A43B 13/14 36/28 |
| 6,026,593 A | 2/2000 | Harmon-Weiss et al. | |
| 6,029,962 A | 2/2000 | Shorten et al. | |
| 6,119,371 A | 9/2000 | Goodwin et al. | |
| 6,253,466 B1 | 7/2001 | Harmon-Weiss et al. | |
| 6,266,897 B1 * | 7/2001 | Seydel | A43B 13/16 36/25 R |
| 6,503,355 B1 | 1/2003 | Anzani et al. | |
| 6,665,958 B2 | 12/2003 | Goodwin | |
| 6,694,642 B2 | 2/2004 | Turner | |
| 6,763,612 B2 | 7/2004 | Stubblefield et al. | |
| 6,837,951 B2 | 1/2005 | Rapaport | |
| 6,848,201 B2 | 2/2005 | Staffaroni et al. | |
| 6,915,594 B2 * | 7/2005 | Kim | A43B 7/08 36/29 |
| 6,944,973 B2 | 9/2005 | Goodwin | |
| 7,080,467 B2 * | 7/2006 | Marvin | A43B 13/203 36/28 |
| 7,086,180 B2 | 8/2006 | Dojan et al. | |
| 7,131,218 B2 * | 11/2006 | Schindler | A43B 13/187 36/29 |
| 7,132,032 B2 | 11/2006 | Tawney et al. | |
| 7,331,124 B2 | 2/2008 | Meschan | |
| 7,430,817 B2 * | 10/2008 | Abadjian | A43B 5/00 36/102 |
| 7,451,556 B2 | 11/2008 | Harmon-Weiss et al. | |
| 7,588,654 B2 * | 9/2009 | Schindler | A43B 13/20 156/147 |
| 7,624,516 B2 | 12/2009 | Meschan | |
| 7,784,196 B1 * | 8/2010 | Christensen | A43B 13/184 36/29 |
| 7,802,378 B2 * | 9/2010 | Harmon Weiss | A43B 1/0027 36/27 |
| 8,181,361 B2 | 5/2012 | Kimura | |
| 8,225,533 B2 | 7/2012 | Meschan | |
| 8,296,969 B2 | 10/2012 | Granger et al. | |
| 8,341,857 B2 * | 1/2013 | Dojan | A43B 13/20 36/28 |
| 2005/0000115 A1 | 1/2005 | Kimura et al. | |
| 2005/0167029 A1 * | 8/2005 | Rapaport | A43B 13/187 156/145 |
| 2005/0252038 A1 * | 11/2005 | Braunschweiler | A43B 3/24 36/28 |
| 2008/0005929 A1 | 1/2008 | Hardy et al. | |
| 2009/0013558 A1 * | 1/2009 | Hazenberg | A43B 1/0009 36/88 |
| 2011/0030240 A1 | 2/2011 | Schmidt | |
| 2011/0131831 A1 | 6/2011 | Peyton et al. | |
| 2012/0117826 A1 | 5/2012 | Jarvis | |
| 2012/0174434 A1 | 7/2012 | Ellis | |
| 2012/0260526 A1 | 10/2012 | Smith et al. | |

* cited by examiner

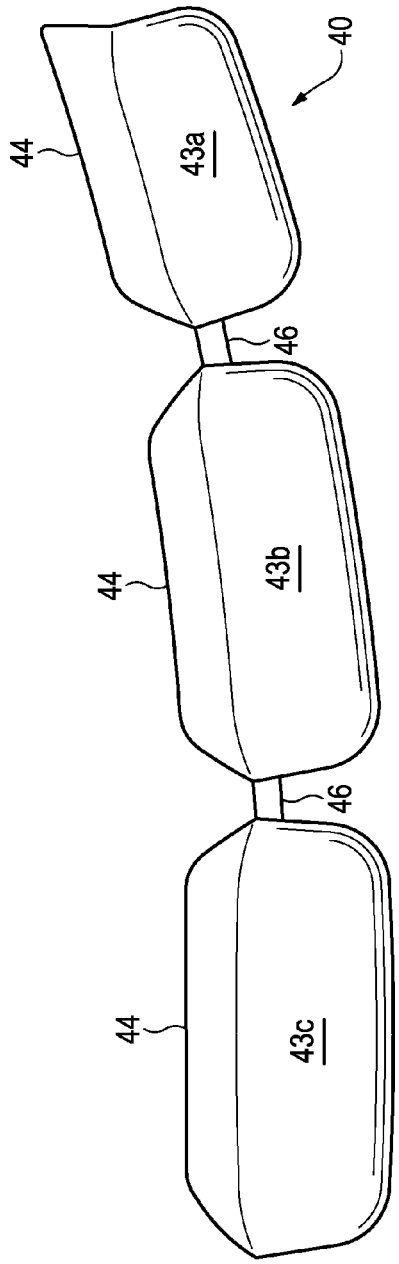
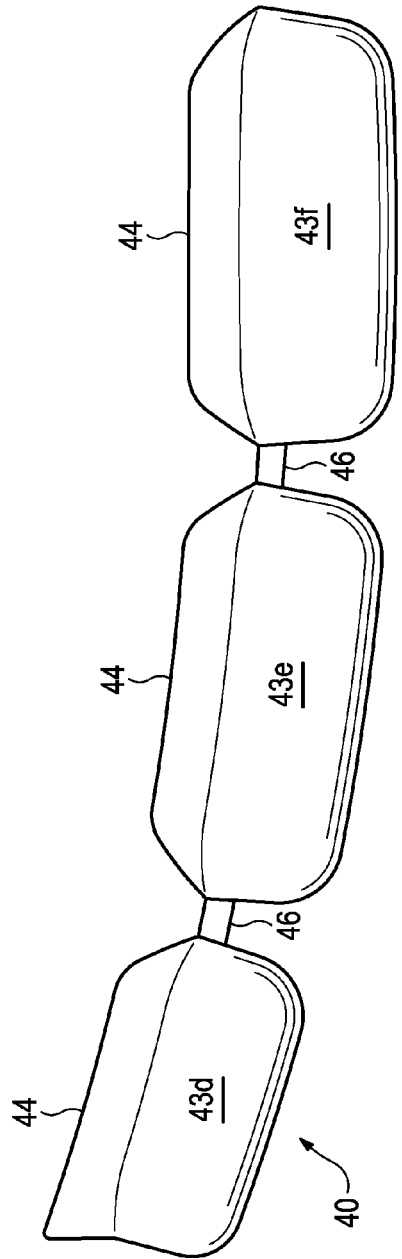
Figure 7
Figure 8

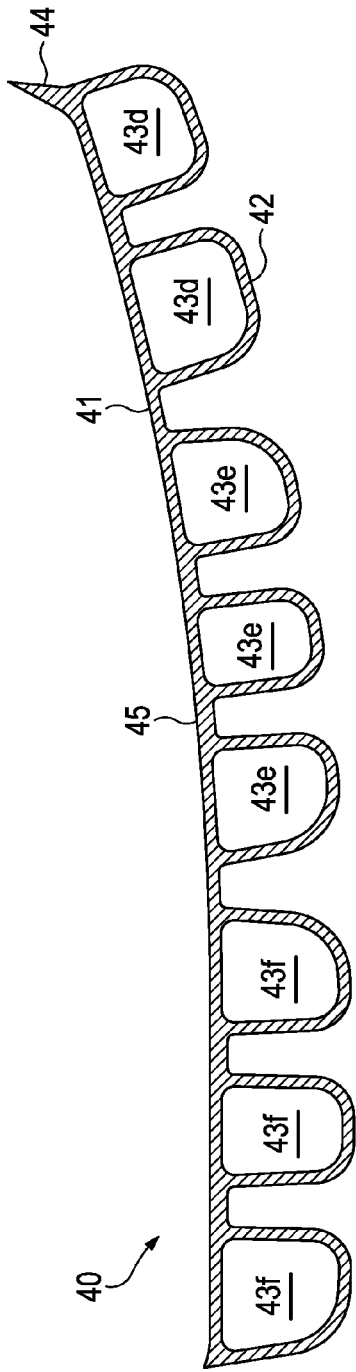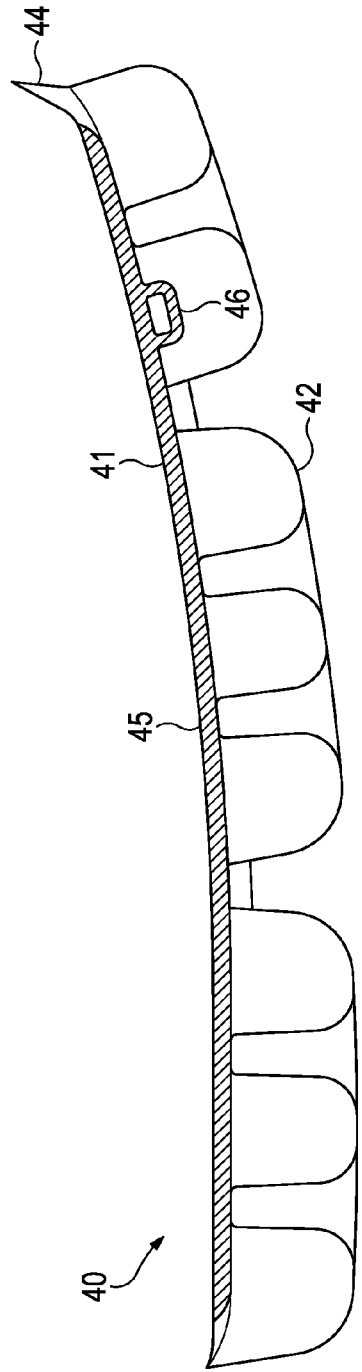
Figure 9D
Figure 9E

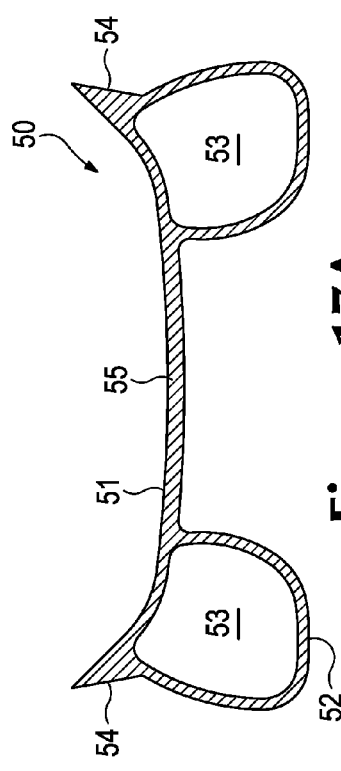
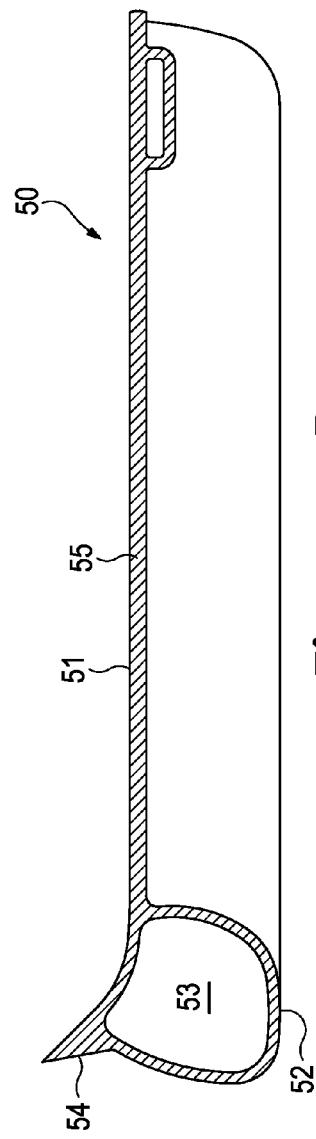
Figure 17A
Figure 17B

ARTICLE OF FOOTWEAR INCORPORATING A CHAMBER SYSTEM AND METHODS FOR MANUFACTURING THE CHAMBER SYSTEM

BACKGROUND

Conventional articles of athletic footwear include two primary elements, an upper and a sole structure. The upper is generally formed from a plurality of elements (e.g., textiles, foam, leather, synthetic leather) that are stitched or adhesively bonded together to form an interior void for securely and comfortably receiving a foot. The sole structure incorporates multiple layers that are conventionally referred to as a sockliner, a midsole, and an outsole. The sockliner is a thin, compressible member located within the void of the upper and adjacent to a plantar (i.e., lower) surface of the foot to enhance comfort. The midsole is secured to the upper and forms a middle layer of the sole structure that attenuates ground reaction forces (i.e., imparts cushioning) during walking, running, or other ambulatory activities. The outsole forms a ground-contacting element of the footwear and is usually fashioned from a durable and wear-resistant rubber material that includes texturing to impart traction.

The primary material forming many conventional midsoles is a polymer foam, such as polyurethane or ethylvinylacetate. In some articles of footwear, the midsole may also incorporate a fluid-filled chamber that increases durability of the footwear and enhances ground reaction force attenuation of the sole structure. In some footwear configurations, the fluid-filled chamber may be at least partially encapsulated within the polymer foam, as in U.S. Pat. No. 5,755,001 to Potter, et al., U.S. Pat. No. 6,837,951 to Rapaport, and U.S. Pat. No. 7,132,032 to Tawney, et al. In other footwear configurations, the fluid-filled chamber may substantially replace the polymer foam, as in U.S. Pat. No. 7,086,180 to Dojan, et al. In general, the fluid-filled chambers are formed from a polymer material that is sealed and pressurized, but may also be substantially unpressurized or pressurized by an external source. In some configurations, textile or foam tensile members may be located within the chamber, or reinforcing structures may be bonded to an exterior surface of the chamber to impart shape to or retain an intended shape of the chamber.

Fluid-filled chambers suitable for footwear applications may be manufactured through various processes, including a two-film technique, thermoforming, and blowmolding. In the two-film technique, two planar sheets of polymer material are bonded together in various locations to form the chamber. In order to pressurize the chamber, a nozzle or needle connected to a fluid pressure source is inserted into a fill inlet formed in the chamber. Following pressurization, the fill inlet is sealed and the nozzle is removed. Thermoforming is similar to the two-film technique, but utilizes a heated mold that forms or otherwise shapes the sheets of polymer material during the manufacturing process. In blowmolding, a molten or otherwise softened elastomeric material in the shape of a tube (i.e., a parison) is placed in a mold having the desired overall shape and configuration of the chamber. The mold has an opening at one location through which pressurized air is provided. The pressurized air induces the liquefied elastomeric material to conform to the shape of the inner surfaces of the mold, thereby forming the chamber, which may then be pressurized.

SUMMARY

An article of footwear has an upper and a sole structure secured to the upper. The sole structure may include a component with a flange extending in an outward direction from a void within a chamber of the component, the flange having a tapered configuration with a first thickness adjacent to the void and a second thickness spaced away from the void, the first thickness being greater than the second thickness.

A method for manufacturing a fluid-filled component may include locating polymer layers within a mold. The polymer layers are compressed between non-parallel seam-forming surfaces to form a tapered seam that joins the polymer layers.

An article of footwear may also include a chamber formed from a polymer material and including a plurality of subchambers. Each of the subchambers may have at least one segment with a width that is less than fourteen millimeters.

An article of footwear may further include a chamber having areas with different thicknesses, and an outsole bonded to areas with a lesser thickness.

The advantages and features of novelty characterizing aspects of the invention are pointed out with particularity in the appended claims. To gain an improved understanding of the advantages and features of novelty, however, reference may be made to the following descriptive matter and accompanying figures that describe and illustrate various configurations and concepts related to the invention.

FIGURE DESCRIPTIONS

The foregoing Summary and the following Detailed Description will be better understood when read in conjunction with the accompanying figures.

FIG. 7 is a lateral side elevational view of the forefoot component.

FIG. 8 is a medial side elevational view of the forefoot component.

FIGS. 9A-9E are cross-sectional views of the forefoot component, as defined by section lines 9A-9E in FIG. 5.

FIGS. 17A and 17B are cross-sectional views of the heel component, as defined by section lines 17A and 17B in FIG. 13.

DETAILED DESCRIPTION

The following discussion and accompanying figures disclose various fluid-filled chambers. Concepts related to the chambers are disclosed with reference to footwear that is suitable for running. The chambers are not limited to footwear designed for running, however, and may be utilized with a wide range of athletic footwear styles, including basketball shoes, cross-training shoes, cycling shoes, football shoes, soccer shoes, tennis shoes, and walking shoes, for example. Various configurations of the chambers may be utilized with footwear styles that are generally considered to be non-athletic, including dress shoes, loafers, sandals, and boots. Accordingly, concepts related to the chambers may apply to a wide variety of footwear styles.

General Footwear Structure

Figure 1:
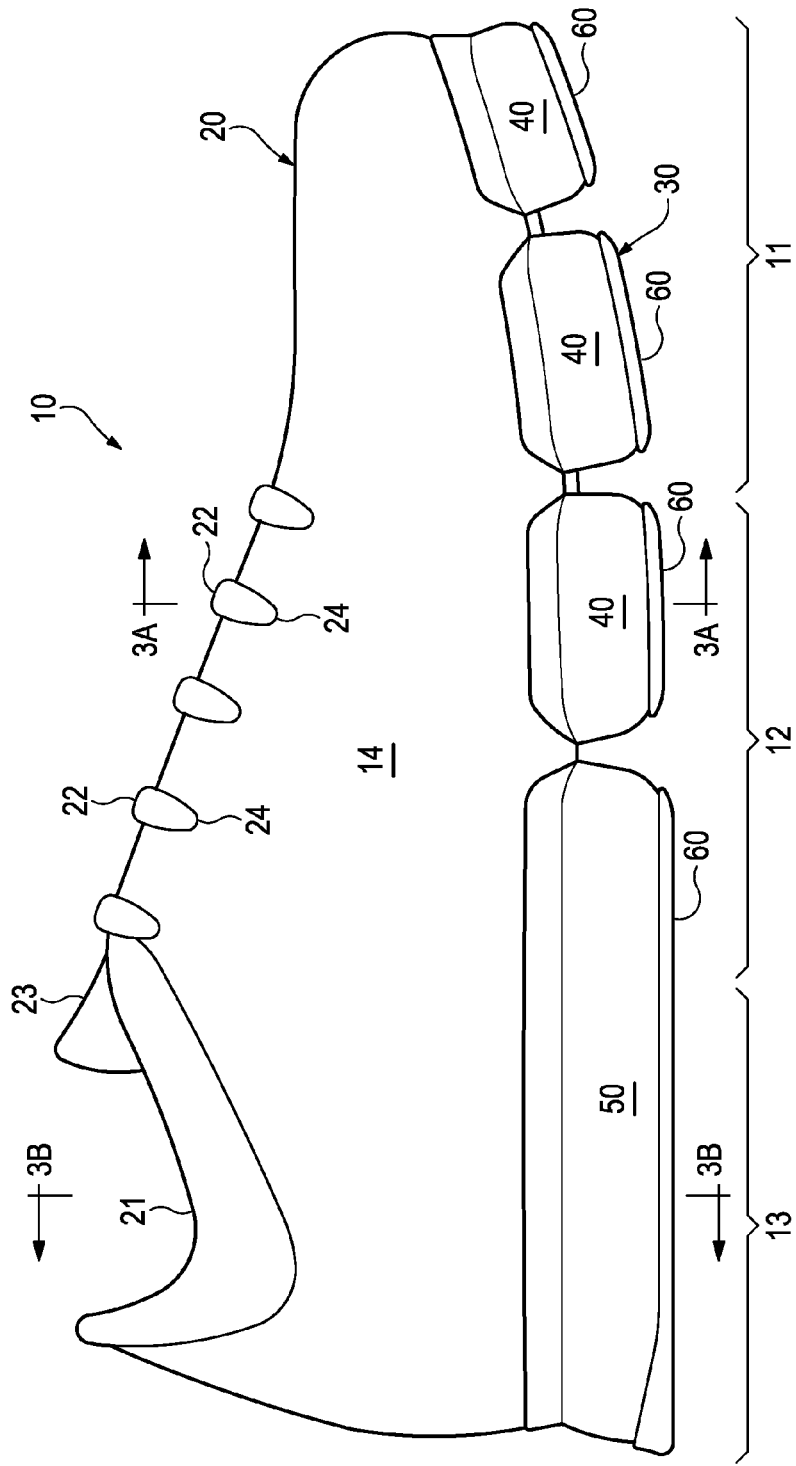
FIG. 1 is lateral side elevational view of an article of footwear.
Figure 2:
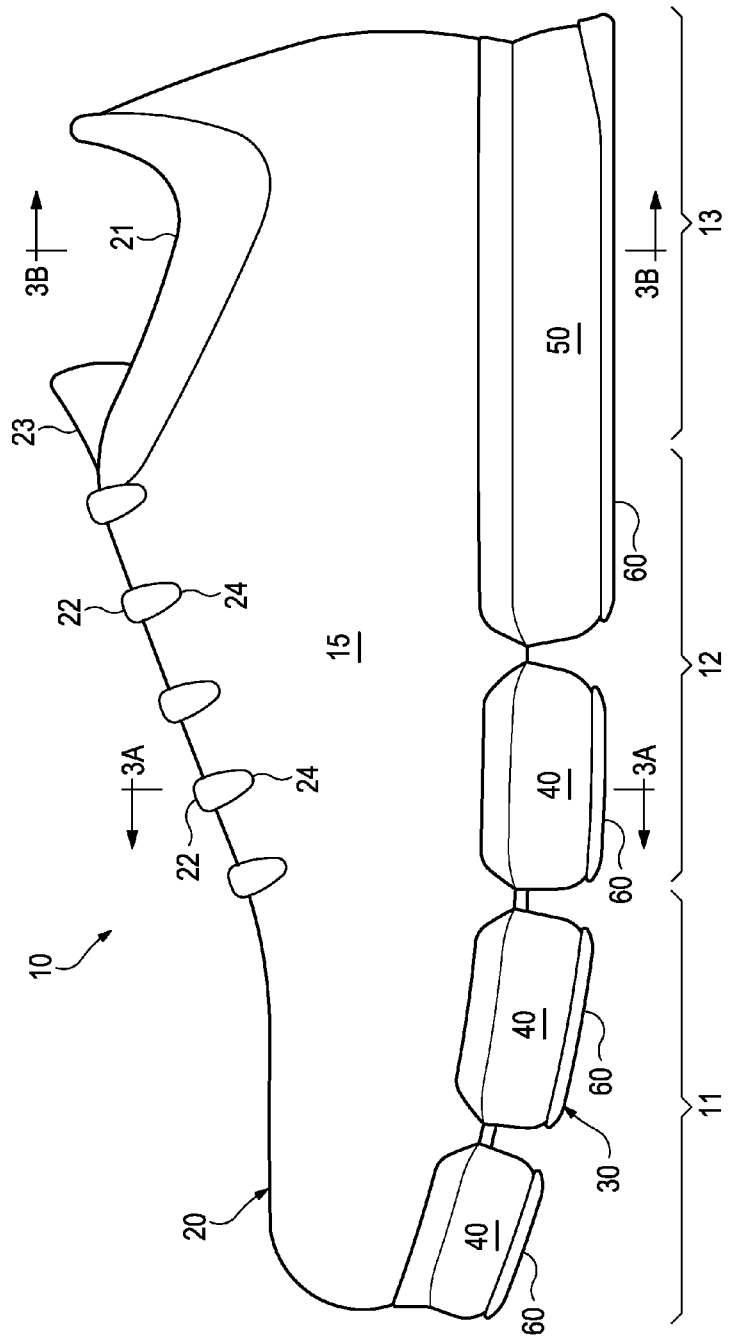
FIG. 2 is a medial side elevational view of the article of footwear.

An article of footwear 10 is depicted in FIGS. 1 and 2 as including an upper 20 and a sole structure 30. Upper 20 provides a comfortable and secure covering for a foot of a wearer. As such, the foot may be located within upper 20 to effectively secure the foot within footwear 10 or otherwise unite the foot and footwear 10. Sole structure 30 is secured to a lower area of upper 20 and extends between the foot and the ground to attenuate ground reaction forces (i.e., cushion the foot), provide traction, enhance stability, and influence the motions of the foot, for example. In effect, sole structure 30 is located under the foot and supports the foot.

For reference purposes, footwear 10 may be divided into three general regions: a forefoot region 11, a midfoot region 12, and a heel region 13. Forefoot region 11 generally includes portions of footwear 10 corresponding with toes of the foot and the joints connecting the metatarsals with the phalanges. Midfoot region 12 generally includes portions of footwear 10 corresponding with an arch area of the foot. Heel region 13 generally corresponds with rear portions of the foot, including the calcaneus bone. Footwear 10 also includes a lateral side 14 and a medial side 15, which correspond with opposite sides of footwear 10 and extend through each of regions 11-13. More particularly, lateral side 14 corresponds with an outside area of the foot (i.e. the surface that faces away from the other foot), and medial side 15 corresponds with an inside area of the foot (i.e., the surface that faces toward the other foot). Regions 11-13 and sides 14-15 are not intended to demarcate precise areas of footwear 10. Rather, regions 11-13 and sides 14-15 are intended to represent general areas of footwear 10 to aid in the following discussion. In addition to footwear 10, regions 11-13 and sides 14-15 may also be applied to upper 20, sole structure 30, and individual elements thereof.

Figure 3A:
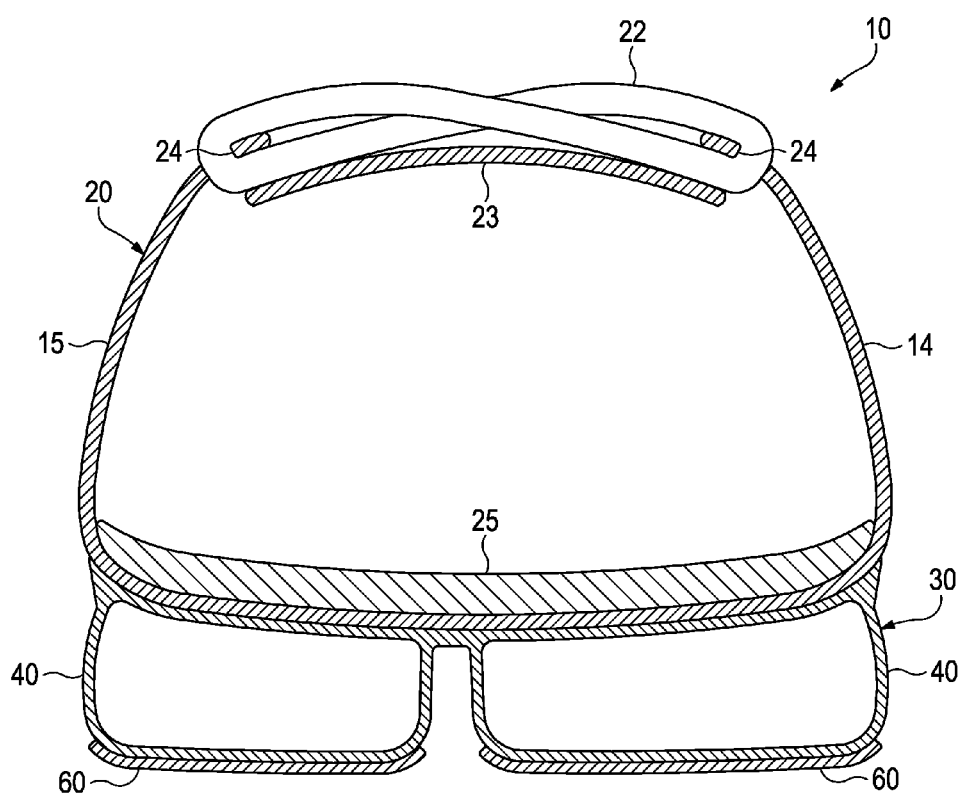
FIGS. 3A and 3B are cross-sectional views of the article of footwear, as defined by section lines 3A and 3B in FIGS. 1 and 2.
Figure 3B:
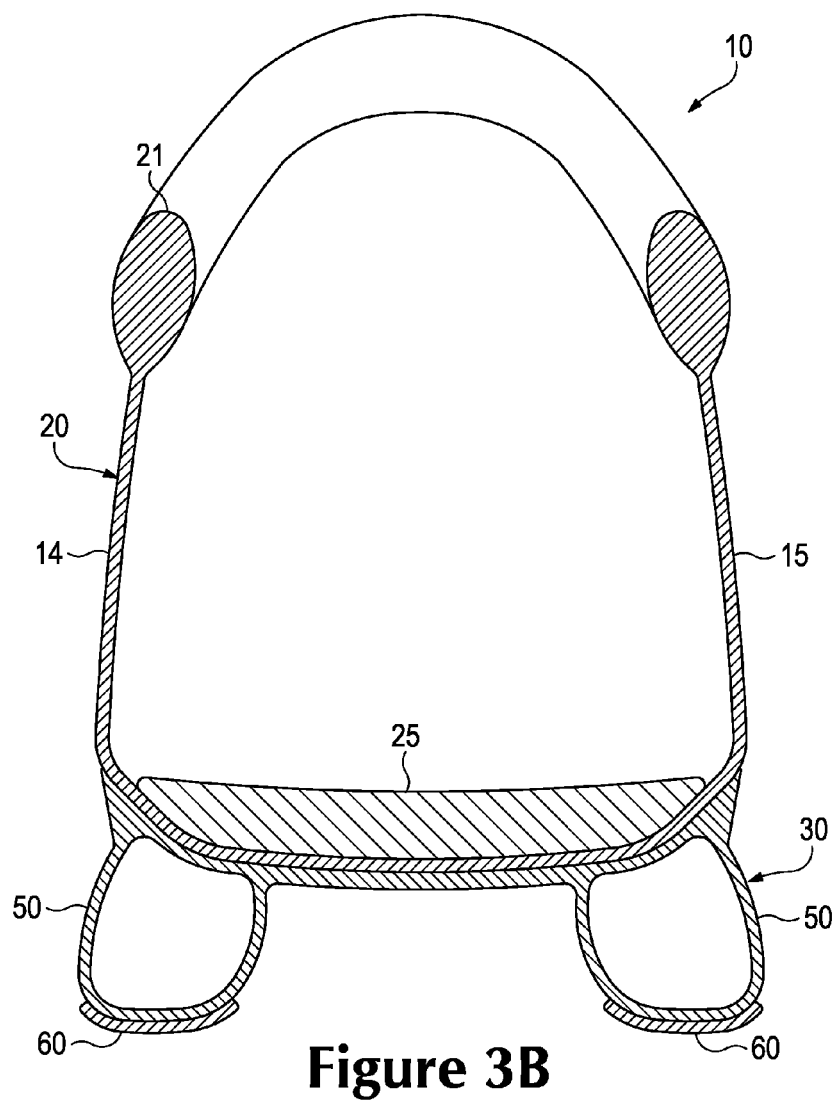
Figure 4:
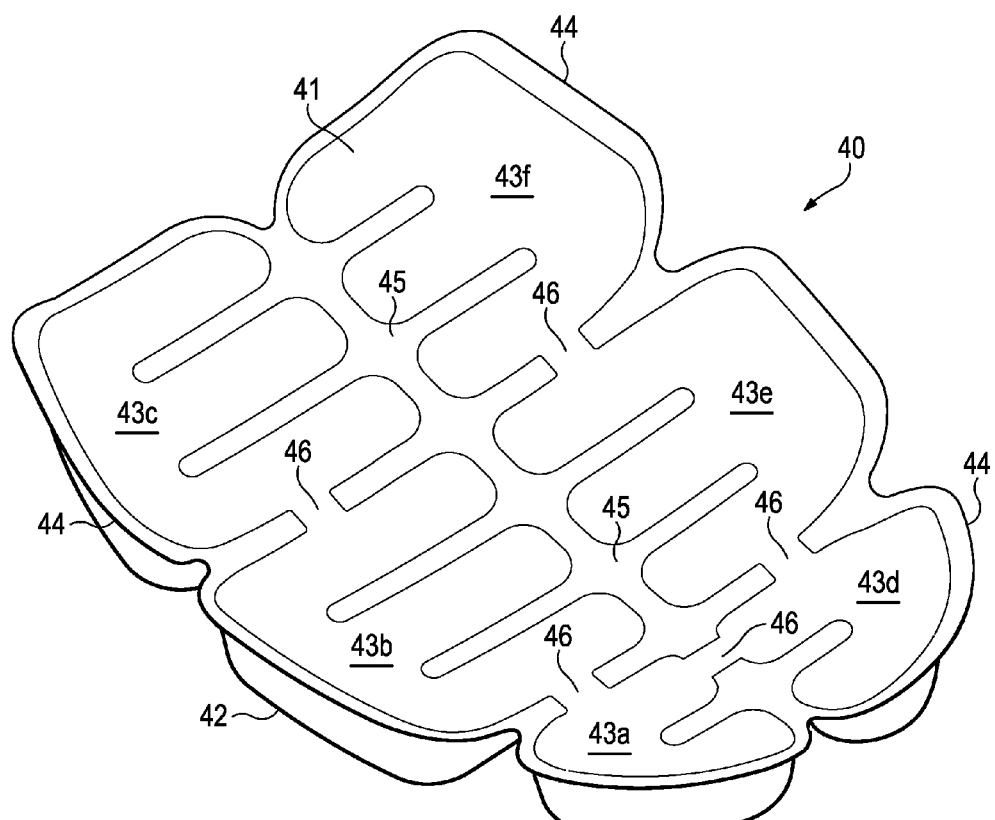
FIG. 4 is a perspective view of a forefoot component of the sole structure.

Upper 20 is depicted as having a substantially conventional configuration. A majority of upper 20 incorporates various material elements (e.g., textiles, foam, leather, and synthetic leather) that are stitched or adhesively bonded together to form an interior void for securely and comfortably receiving a foot. The material elements may be selected and located in upper 20 to selectively impart properties of durability, air-permeability, wear-resistance, flexibility, and comfort, for example. The void in upper 20 is shaped to accommodate the foot. When the foot is located within the void, therefore, upper 20 extends along a lateral side of the foot, along a medial side of the foot, over the foot, around the heel, and under the foot. An ankle opening 21 in heel region 13 provides the foot with access to the void. A lace 22 extends over a tongue 23 and through various lace apertures 24 or other lace-receiving elements in upper 20. Lace 22 and the adjustability provided by tongue 23 may be utilized in a conventional manner to modify the dimensions of ankle opening 21 and the interior void, thereby securing the foot within the interior void and facilitating entry and removal of the foot from the interior void. As depicted in FIGS. 3A and 3B, upper 20 also includes a sockliner 25 that is located within the void and positioned to extend under a lower surface of the foot to enhance the comfort of footwear 10. Further configurations of upper 20 may also include one or more of (a) a toe guard positioned in forefoot region 11 and formed of a wear-resistant material, (b) a heel counter located in heel region 13 for enhancing stability, and (c) logos, trademarks, and placards with care instructions and material information. Given that various aspects of the present discussion primarily relate to sole structure 30, upper 20 may exhibit the general configuration discussed above or the general configuration of practically any other conventional or non-conventional upper. Accordingly, the structure of upper 20 may vary significantly within the scope of the present disclosure.

The primary elements of sole structure 30 are a forefoot component 40, a heel component 50, and an outsole 60. Each of components 40 and 50 are directly secured to a lower area of upper 20 and formed from a polymer material that encloses a fluid, which may be a gas, liquid, or gel. During walking and running, for example, components 40 and 50 compress between the foot and the ground, thereby attenuating ground reaction forces. That is, components 40 and 50 are inflated and generally pressurized with the fluid to cushion the foot. Outsole 60 is secured to lower areas of components 40 and 50 and may be formed from a wear-resistant rubber material that is textured to impart traction. In some configurations, sole structure 30 may include a foam layer, for example, that extends between upper 20 and one or both of components 40 and 50, or a foam element may be located within indentations in the lower areas of components 40 and 50. In other configurations, sole structure 30 may incorporate plates, moderators, lasting elements, or motion control members that further attenuate forces, enhance stability, or influence the motions of the foot.

Forefoot Component

Forefoot component 40 is depicted separate from footwear 10 in FIGS. 4-8 and is formed from a polymer material that defines a first or upper surface 41 and an opposite second or lower surface 42. Whereas upper surface 41 is secured to upper 20, different portions of lower surface 42 are either secured to outsole 60 or exposed and visible from an exterior surface of footwear 10. As described in greater detail below, upper surface 41 and lower surface 42 are formed from polymer layers during a molding or thermoforming process. More particularly, upper surface 41 is formed from one polymer layer, and lower surface 42 is formed from another polymer layer.

Forefoot component 40 includes a plurality of chambers 43a-43f, a flange 44, a web area 45, and various conduits 46. Chambers 43a-43f enclose or contain the fluid within forefoot component 40. More particularly, chambers 43a-43f are areas of forefoot component 40 where the polymer layers forming surfaces 41 and 42 are separated or spaced from each other to form voids for enclosing the fluid within forefoot component 40. Flange 44 extends around a peripheral area of forefoot component 40 and is formed from portions of the polymer layers that are molded and joined together. Web area 45 extends through a central area of forefoot component 40 and between the various chambers 43. Like flange 44, web area 45 is formed from portions of the polymer layers that are joined together. Although adhesive bonding may be utilized in joining the polymer layers in flange 44 and web area 45, thermal bonding may also join the polymer layers during the molding or thermoforming process. Conduits 46 extend between chambers 43a-43f and form channels that place chambers 43a-43f in fluid communication. That is, the fluid within forefoot component 40 may be transferred between chambers 43a-43f by passing through conduits 46. Like chambers 43a-43f, conduits 46 are formed from separated or spaced portions of the polymer layers forming surfaces 41 and 42.

Chambers 43a-43f are the primary components of forefoot component 40 that enclose the fluid. In areas immediately adjacent to each of chambers 43a-43f, the polymer layers forming surfaces 41 and 42 are joined to each other to form a bond that seals the fluid within forefoot component 40. More particularly, flange 44 and web area 45 cooperatively bound or otherwise extend around each of chambers 43a-43f and are formed from areas of the polymer layers that are bonded to each other, thereby sealing the fluid within chambers 43. Although chambers 43a-43f effectively contain the fluid within forefoot component 40, each of chambers 43a-43f are placed in fluid communication through conduits 46. In further configurations of footwear 10, however, one or more of conduits 46 may be absent to segregate the fluid in one of chambers 43a-43f from the fluid in another one of chambers 43a-43f, and the fluids may be pressurized differently. In other configurations, forefoot component 40 may be a part of a fluid system that, for example, pumps fluid into chambers 43a-43f to tailor the pressure within forefoot component 40 to the preferences or running style of the wearer.

Upper surface 41 has a generally concave, rounded, and relatively smooth configuration that supports the foot when footwear 10 is worn. Referring to the cross-sections of FIGS. 9A-9C, for example, the rounded configuration of upper surface 41 lays on a curved plane that is cooperatively formed by chambers 43a-43f, flange 44, web area 45, and conduits 46. In contrast, lower surface 42 is more contoured, with chambers 43a-43f extending or protruding downward from flange 44 and web area 45. In effect, therefore, the portions of chambers 43a-43f that protrude downward form independent supports or cushioning elements in sole structure 30.

Undulations or other discontinuities in first surface 41, which supports the foot, that are greater than one millimeter may decrease footwear comfort. The pressure of the fluid within chambers 43a-43f tends to press outward upon the polymer layers forming surfaces 41 and 42, which causes areas of forefoot component 40 corresponding with chambers 43a-43f to bulge or protrude outward. Although first surface 41 may exhibit some undulations adjacent to chambers 43a-43f, the size of these undulations is generally limited to less than one millimeter, thereby enhancing the comfort of footwear 10.

Various features of forefoot component 40 operate cooperatively to limit the size of the undulations in first surface 41, including (a) a thickness of the polymer material forming chambers 43a-43f, (b) the pressure of the fluid within chambers 43a-43f, and (c) the width of chambers 43a-43f between spaced portions of web area 45. In general, as the thickness of the polymer material forming chambers 43a-43f increases, or as the pressure of the fluid within chambers 43a-43f decreases, the degree to which chambers 43a-43f bulge or protrude outward and form undulations decreases. For footwear applications, a polymer thickness of 0.75 millimeter (0.03 inch) and a fluid pressure of 138 kilopascals (20 pounds per square inch) provides a suitable degree of compliance, force attenuation, and other properties. Given this thickness and pressure, having a maximum width of less than 14 millimeters, and possibly less than 12 millimeters, in chambers 43a-43f limits the size of undulations in first surface 41 to less than one millimeter.

Figure 5:
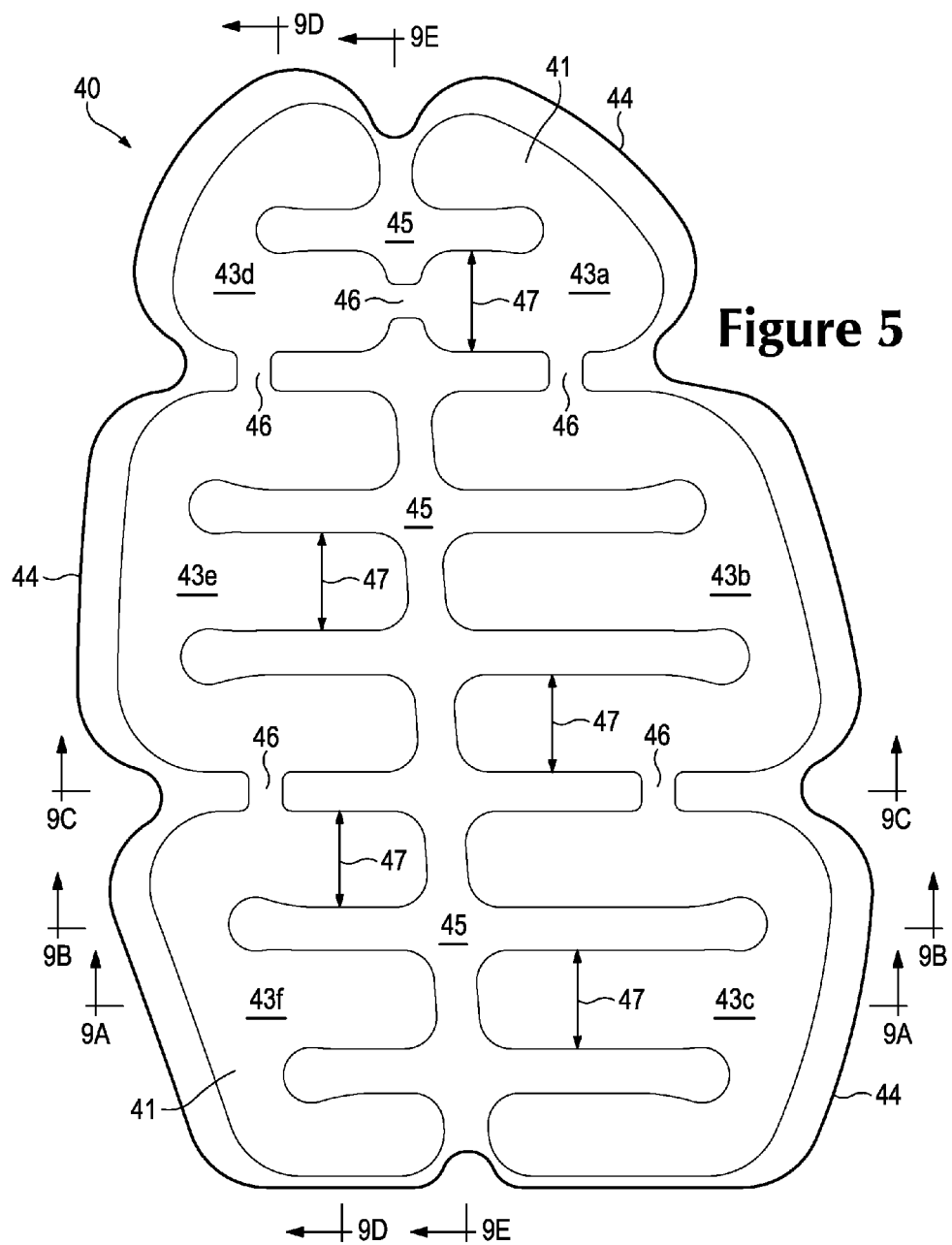
FIG. 5 is a top plan view of the forefoot component.
Figure 6:
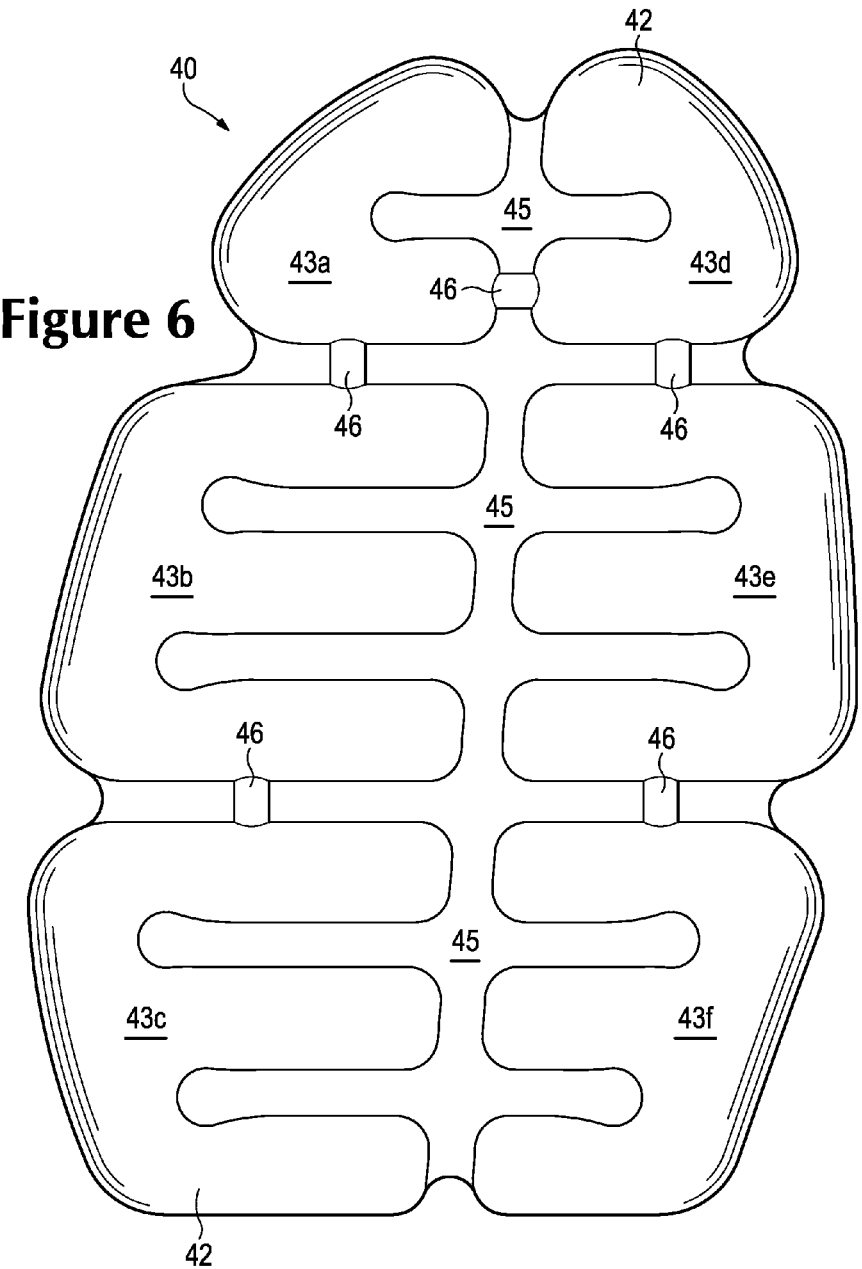
FIG. 6 is a bottom plan view of the forefoot component.

A width dimension 47 is depicted in FIGS. 5, 6, and 9D as extending (a) across various portions of chambers 43a-43f, (b) between spaced portions of web area 45, and (c) in a direction that is generally parallel to the most proximal area of first surface 41. Chambers 43a-43f have E-shaped and C-shaped configurations. Whereas some areas of chambers 43a-43f are located adjacent to flange 44, other areas of chambers 43a-43f extend inward and toward a central area of forefoot component 40. In the example of subchambers 43b and 43e, which are E-shaped, each has three parallel and generally linear segments that extend inward and are bounded on opposite sides by portions of web area 45. As such, width dimension 47 may be measured between the spaced portions of web area 45 that are located on opposite sides of the three parallel segments. In the example of subchambers 43c and 43f, which are also E-shaped, each has two parallel and generally linear segments that extend inward and are bounded by web area 45. As such, width dimension 47 may be measured between the spaced portions of web area 45 that are located on opposite sides of two parallel segments. In the example of subchambers 43a and 43d, which are C-shaped, each has one generally curved segment that extends inward and is bounded by web area 45. As such, width dimension 47 may be measured between the spaced portions of web area 45 that are located on opposite sides of the segments. Note that portions of subchambers 43a-43f that are immediately adjacent to flange 44 may also have a maximum width of less than 14 millimeters, and possibly less than 12 millimeters, but may also have a maximum width greater than 14 millimeters.

In addition to E-shaped and C-shaped configurations, any of chambers 43a-43f may be structured to have F, H, I, J, K, L, M, N, S, T, U, V, W, X, and Y-shaped configurations, in addition to various other shapes, whether following letters of the alphabet or being non-regular. In general, however, one or more of chambers 43a-43f will have a shape formed from relatively narrow and elongate segments having a maximum width of less than 14 millimeters, and possibly less than 12 millimeters. Moreover, these segments will extend into a central area of forefoot component 40 and be bounded on opposite sides by portions of web area 45.

Although width dimension 47 of chambers 43a-43f may be limited to less than 14 or 12 millimeters, the height and length of the various segments forming chambers 43a-43f may vary considerably. In general and with all other factors being the same, as the volume of each of chambers 43a-43f increases, the degree of cushioning or force attenuation provided by forefoot component 40 also increases. By maximizing the heights and lengths of portions or segments in chambers 43a-43f, cushioning or force attenuation properties may also be enhanced. As an example, in some configurations of forefoot component 40, the height of chambers 43a-43f may be more than fourteen millimeters, with the height being measured in a direction that is perpendicular to the width dimension 47 and at a location of width dimension 47.

Chambers 43 are located along or adjacent to opposite sides of forefoot component 40. When incorporated into footwear 10, a first group of chambers 43a-43c are located on lateral side 14 and a second group of chambers 43d-43f are located on medial side 15. In effect, therefore, the two groups are located adjacent to sides 14 and 15, and web area 45 extends between the groups. In other configurations of forefoot component 40, however, chambers 43 may be positioned in other arrangements or locations within forefoot component 40. One or more of chambers 43 may also extend between opposite sides of forefoot component 40, rather than being positioned adjacent to one side of forefoot component 40.

Flange 44 forms a peripheral seam or bonded area that joins the polymer layers forming surfaces 41 and 42 and assists with sealing the fluid within forefoot component 40 and the voids of chambers 43a-43f. In general, flange 44 has a height of at least five millimeters and extends in an outward direction from a remainder of forefoot component 40. Relative to the voids within chambers 43a-43f, flange 44 extends outward from the voids. More particularly, flange 44 extends in an upward direction from the peripheral area or an upper area of forefoot component 40. Whereas the area of flange 44 corresponding with first surface 41 faces toward and is secured to upper 20, the area of flange 44 corresponding with second surface 42 faces away from and forms a portion of an exterior surface of footwear 10. More simply, one surface of flange 44 is secured to upper 20, and the opposite surface of flange 44 faces away from upper 20. Given that flange 44 is a relatively thick and stiff portion of forefoot component 40, flange 44 may enhance the stability of footwear 10. Flange 44 may also provide a defined lasting margin during steps of the manufacturing process that involve bonding upper 20 to forefoot component 40.

Figure 9A:
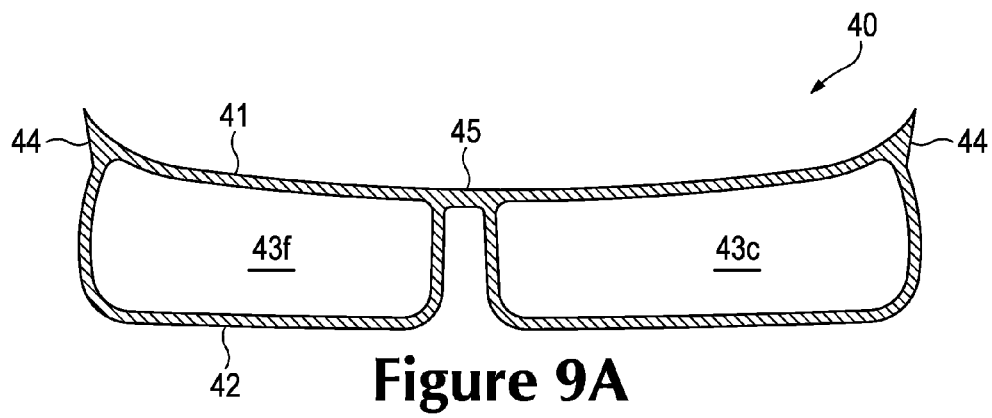
Figure 9B:
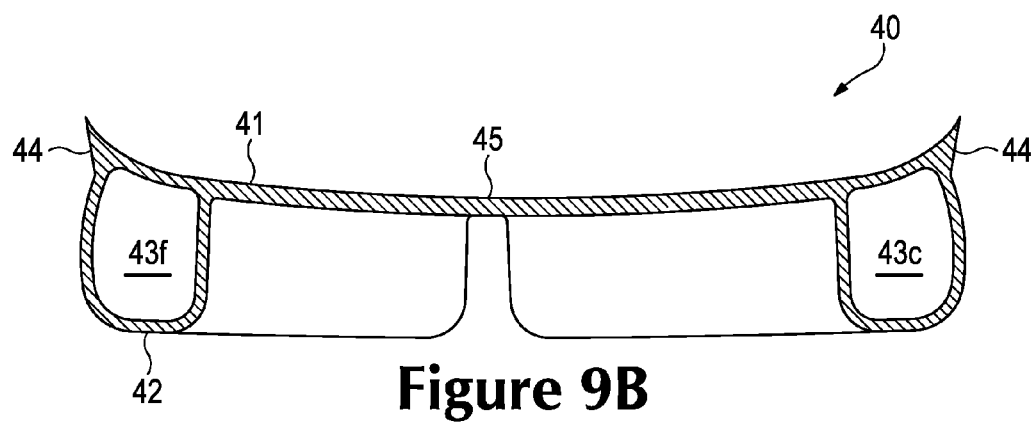

Referring to the cross-sections of FIGS. 9A and 9B, for example, flange 44 is depicted as having a tapered configuration, with the portions of flange 44 located adjacent to the voids in chambers 43a-43f having greater thickness than the portions of flange 44 that are spaced from the voids and form a distal end. In effect, therefore, flange 44 has a tapered configuration with a first thickness adjacent to the voids and a second thickness spaced away from the voids, the first thickness being greater than the second thickness. Moreover, thickness of the portions of flange 44 located adjacent to the voids (i.e., the first thickness) is greater than either of (a) the thickness of web area 45 in the central area of forefoot component 40 and (b) the sum of the thicknesses of the polymer layers forming surfaces 41 and 42. Although flange 44 is formed from the polymer layers forming surfaces 41 and 42 and web area 45, flange 44 has a greater thickness than both of the polymer layers combined. As noted above, flange 44 is a relatively thick and stiff portion of forefoot component 40. A portion of the stiffness may be due, therefore, to the greater thickness of flange 44 adjacent to chambers 43a-43f. A process for forming flange 44 to have this configuration will be discussed below.

Figure 9C:
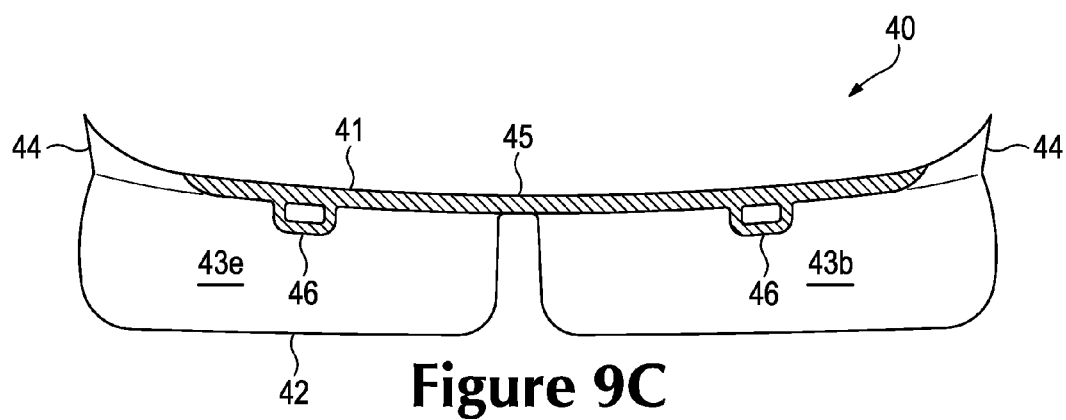

Although flange 44 is present in areas adjacent to chambers 43a-43f, flange 44 is depicted as being absent or having minimal height and thickness in areas between chambers 43a-43f, as depicted in FIGS. 9C and 9E. This configuration provides enhanced flexibility to forefoot component 40. More particularly, given that flange 44 is a relatively thick and stiff portion of forefoot component 40, areas where flange 44 are absent or minimized may have greater flexibility.

Web area 45 extends throughout a central area of forefoot component 40 to separate and interconnect the various chambers 43a-43f. In this position, web area 45 forms a bonded area that joins the polymer layers forming surfaces 41 and 42 and also assists with sealing the fluid within the voids of chambers 43a-43f. Whereas chambers 43a-43f protrude outward to form structures for receiving the fluid within forefoot component 40, web area 45 exhibits lesser thickness to provide flexibility in forefoot component 40 and permit each of chambers 43a-43f to move or deflect independently in footwear 100. As noted above, flange 44 may be absent or have minimal height and thickness in areas between chambers 43a-43f, thereby further contributing to flexibility in forefoot component 40.

Various factors may be considered when selecting materials for forefoot component 40, including each of polymer layers 41 and 42. As an example, the engineering properties of the materials (e.g., tensile strength, tear strength, flexural fatigue strength, modulus of elasticity, and abrasion resistance) may be considered. The ability of the materials to be shaped into chambers 43a-43f and bonded to form flange 44 and web area 45 during the manufacture of forefoot component 40 may also be considered. Additionally, the ability of the materials to prevent the transmission (e.g., diffusion, permeation) of the fluid contained by forefoot component 40 may be considered. Suitable materials for forefoot component 40 include a variety of thermoset and thermoplastic polymer materials. An advantage of thermoplastic polymer materials is that they may be molded (e.g., thermoformed) to impart the shapes of chambers 43a-43f and flange 44. Moreover, thermoplastic polymer materials may be thermal bonded to each other to form flange 44 and web area 45. Given these considerations, examples of polymer materials that may be utilized for forefoot component 40 include any of the following: polyurethane, urethane, polyester, polyester polyurethane, polyether, polyether polyurethane, latex, polycaprolactone, polyoxypropylene, polycarbonate macroglycol, and mixtures thereof.

Although any of the materials noted above may be utilized for forefoot component 40, various materials exhibit both diffusion-prevention and thermoplastic properties. An example of this material is disclosed in U.S. Pat. Nos. 5,713,141 and 5,952,065 to Mitchell, et al., both of which are incorporated herein by reference. Although various configurations may be utilized, this material generally includes layers of a thermoplastic polymer material and a barrier material. The thermoplastic polymer material provides the ability to form contoured shapes and thermal bonds, as well as a suitable degree of tensile strength, tear strength, flexural fatigue strength, modulus of elasticity, and abrasion resistance. The barrier material is effective in limiting the transmission of the fluid within forefoot component 40 (e.g., air, nitrogen, or sulfur-hexafluoride). As another example, forefoot component 40 may be formed from other layered materials, including a flexible microlayer membrane that has alternating layers of a gas barrier material and an elastomeric material, as disclosed in U.S. Pat. Nos. 6,082,025 and 6,127,026 to Bonk, et al., both of which are incorporated herein by reference. Additional suitable materials are disclosed in U.S. Pat. Nos. 4,183,156 and 4,219,945 to Rudy, both of which are incorporated herein by reference. Further suitable materials include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340; 6,203,868; and 6,321,465 to Bonk, et al., each of which are incorporated herein by reference.

Figure 10A:
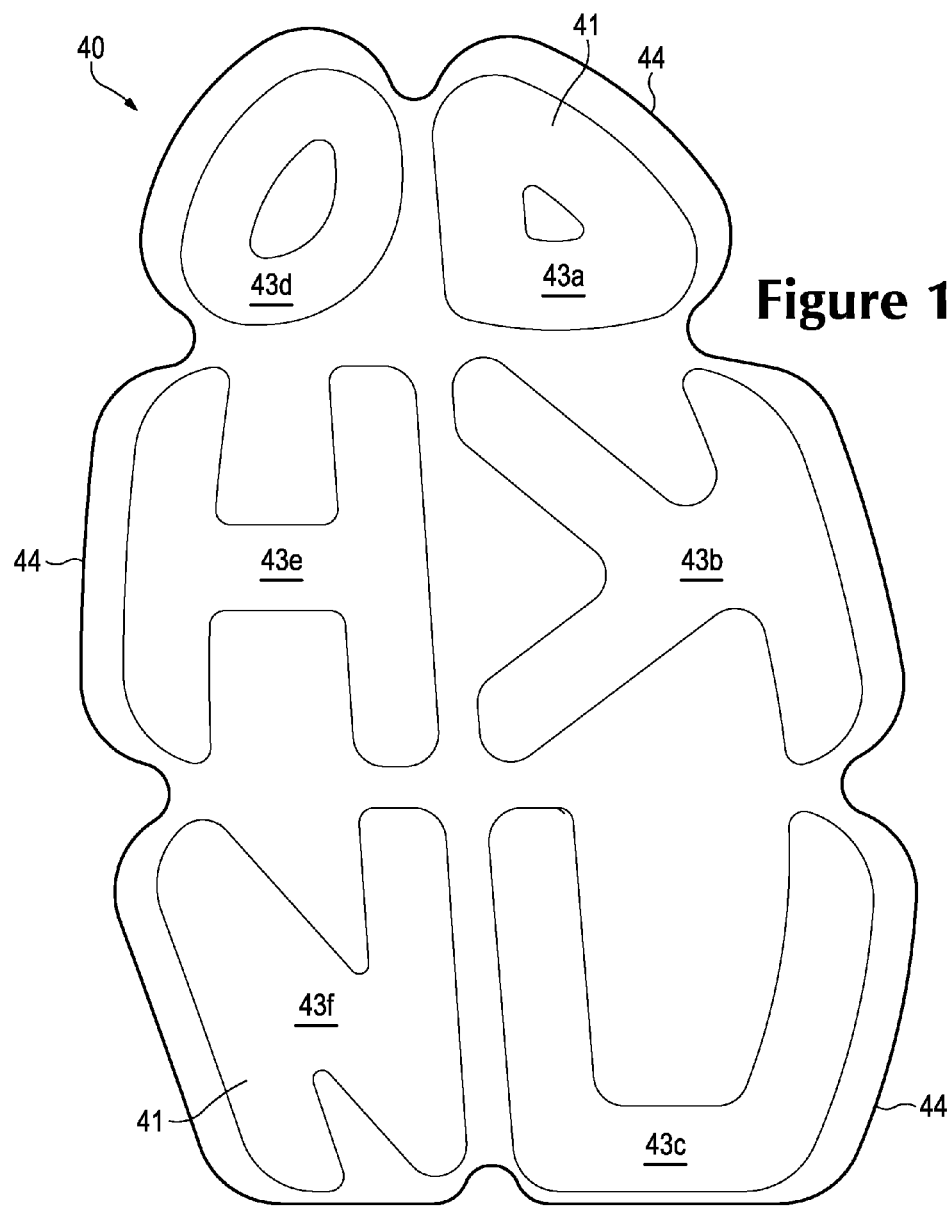
FIGS. 10A-10E are top plan views corresponding with FIG. 5 and depicting further configurations of the forefoot component.
Figure 10B:
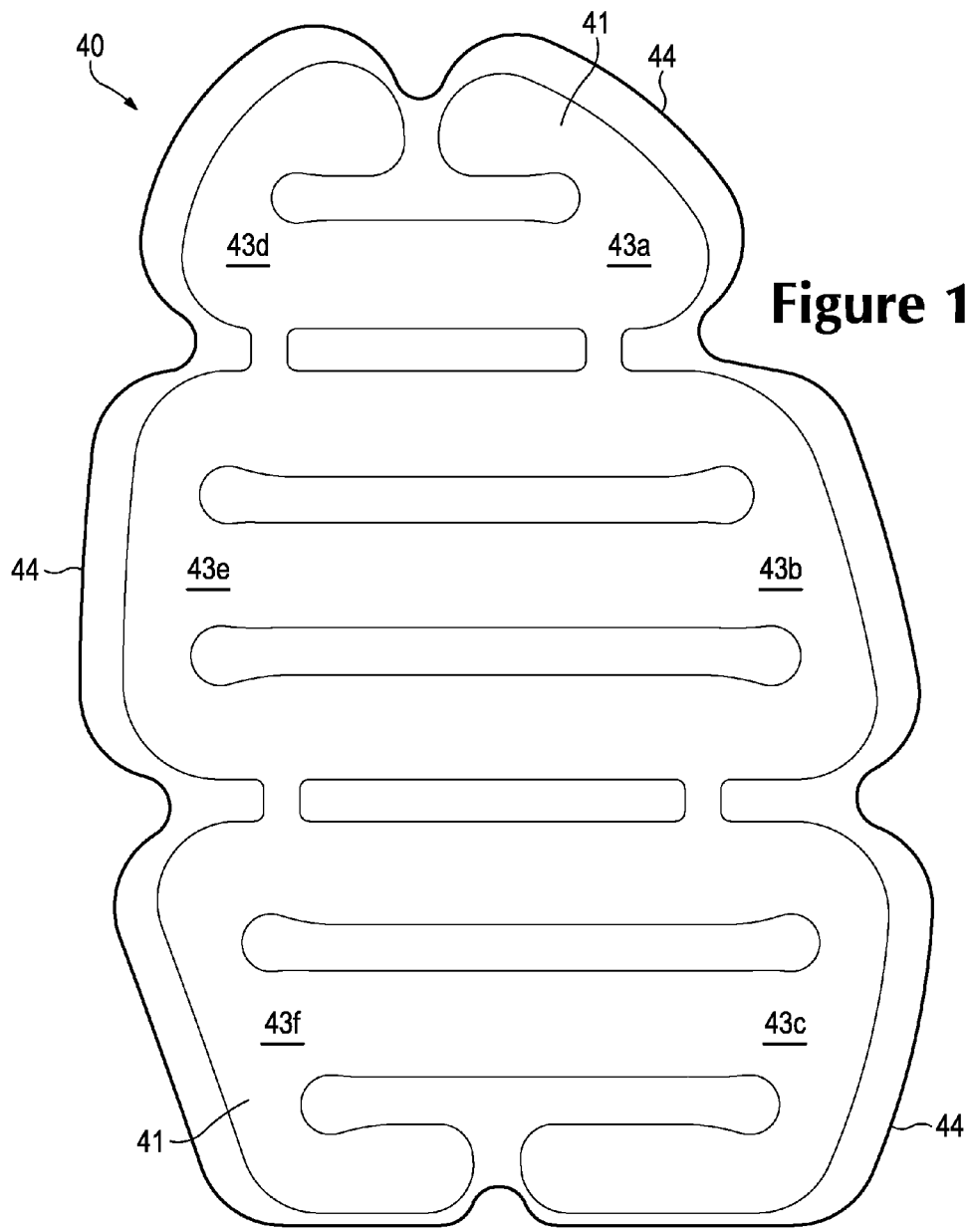
Figure 10C:
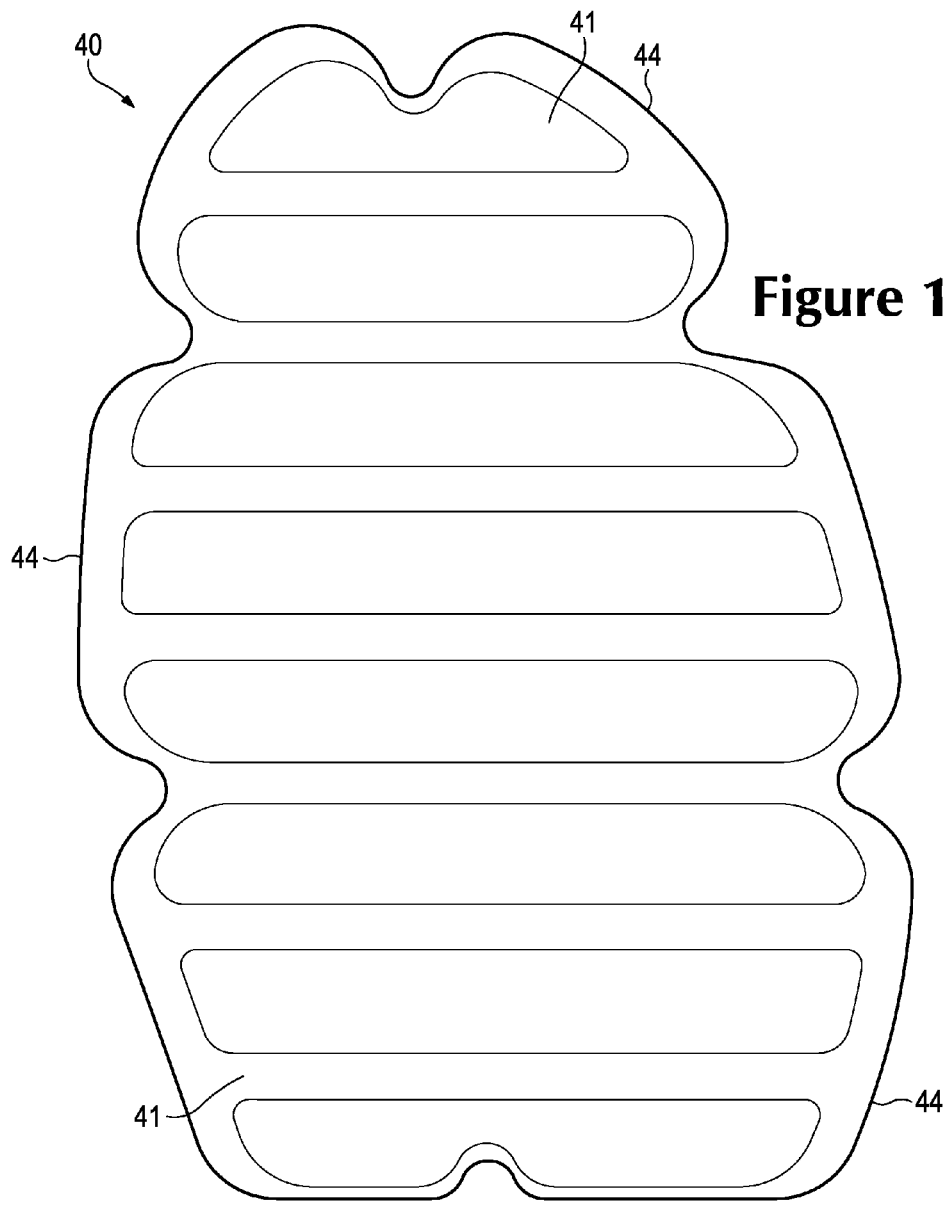
Figure 10D:
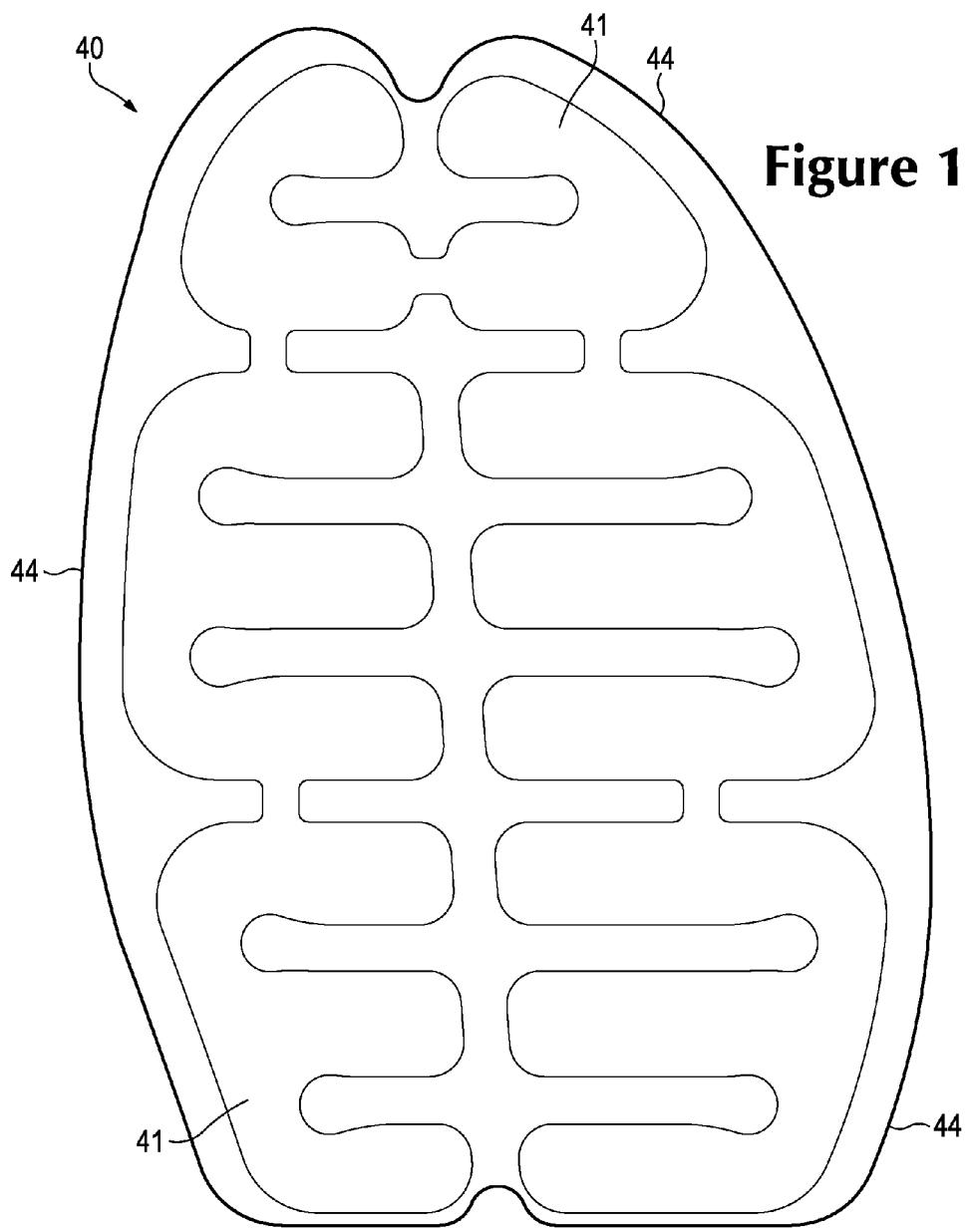
Figure 10E:
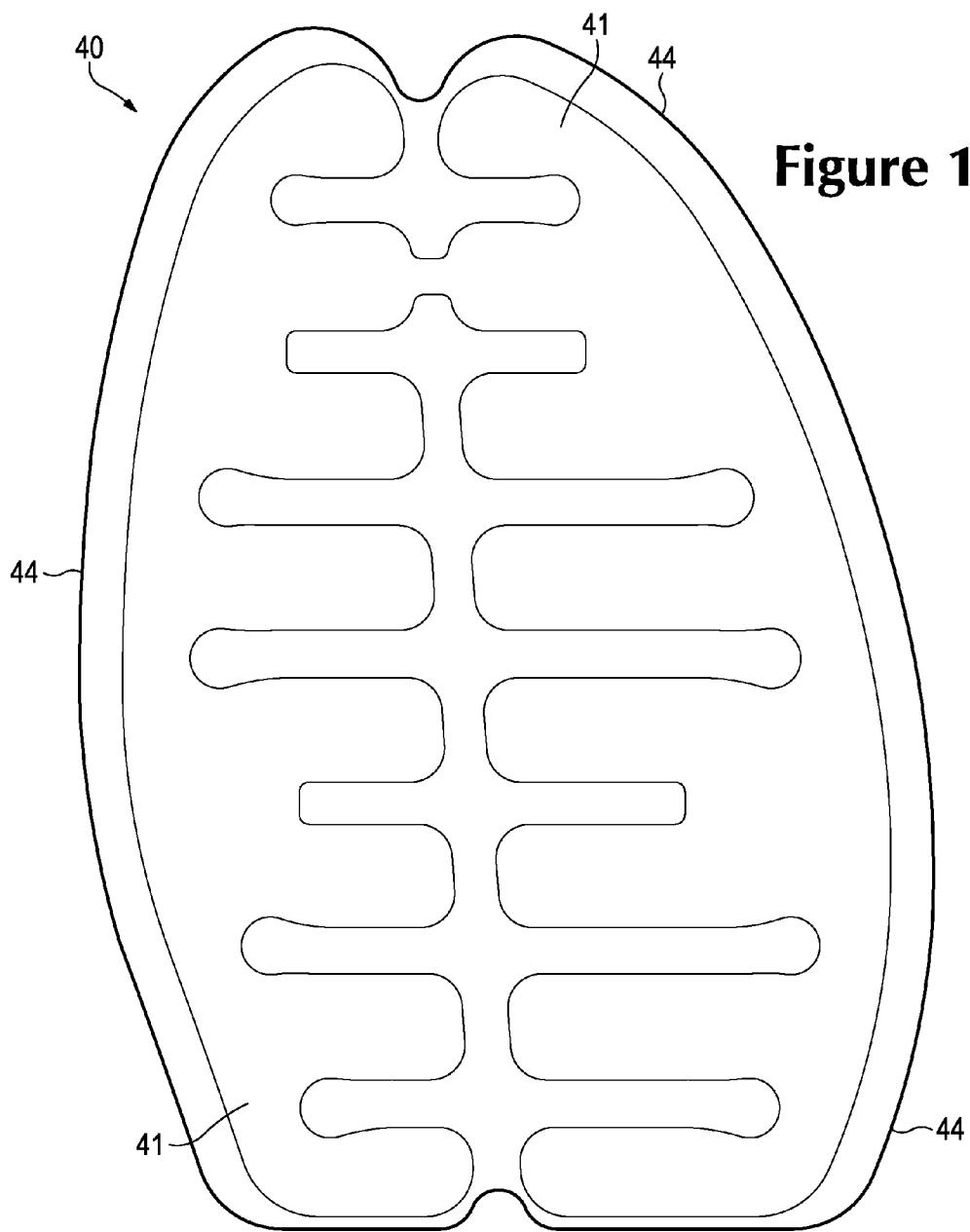

The configuration of forefoot component 40 discussed above provides one example of a suitable configuration for use in footwear 10 and other products. A variety of other configurations may also be utilized. For example, FIG. 10A depicts chambers 43a-43f as having D, K, U, O, H, and N-shaped configurations. By varying the shapes of chambers 43a-43f, the properties of each of chambers 43a-43f and different areas of forefoot component 40 may be varied. Referring to FIG. 10B, chambers 43a-43f are connected across the central area of forefoot component 40, which may decrease longitudinal flexibility in sole structure 30 and provide additional force attenuation. A similar configuration is depicted in FIG. 10C, wherein chambers 43b, 43c, 43e, and 43f are replaced with various tubes that extend across forefoot component 40. Although flange 44 may be absent or minimal between chambers 43a-43f, FIG. 10D depicts a configuration wherein flange 44 extends continuously along opposite sides of forefoot component 40. As a similar example, FIG. 10E depicts chambers 43a-43f as being interconnected along the peripheral area of forefoot component 40, also with flange 44 extending continuously along opposite sides of forefoot component 40.

Figure 11A:
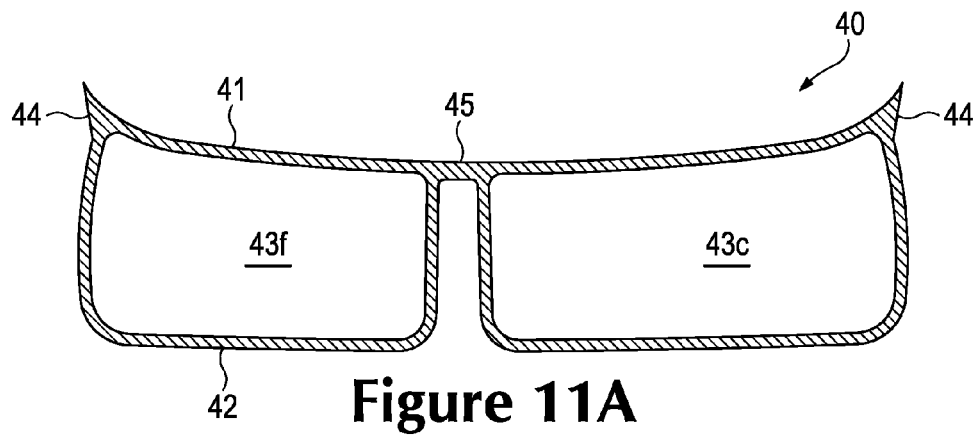
FIGS. 11A-11E are cross-sectional views corresponding with FIG. 9A and depicting further configurations of the forefoot component.
Figure 11B:
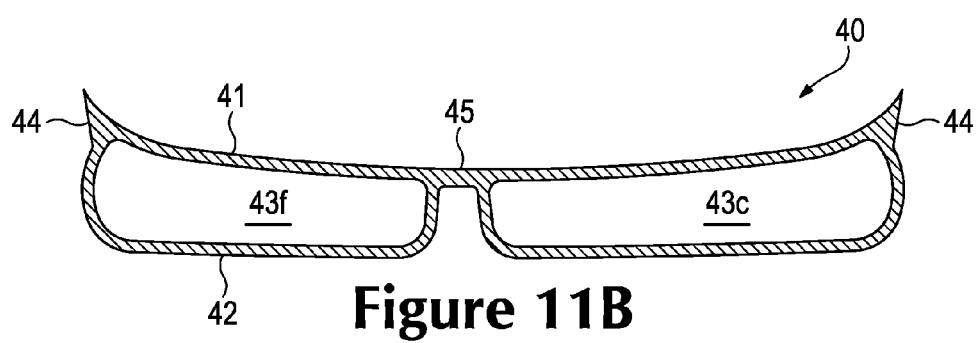
Figure 11C:
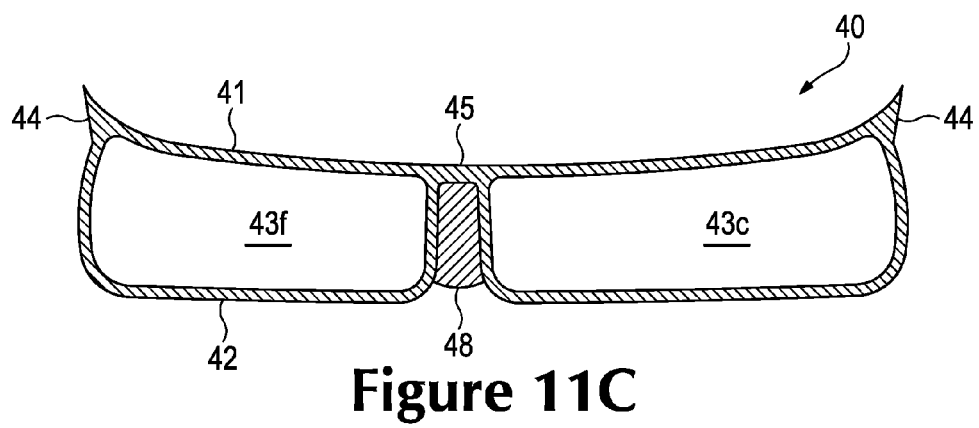
Figure 11D:
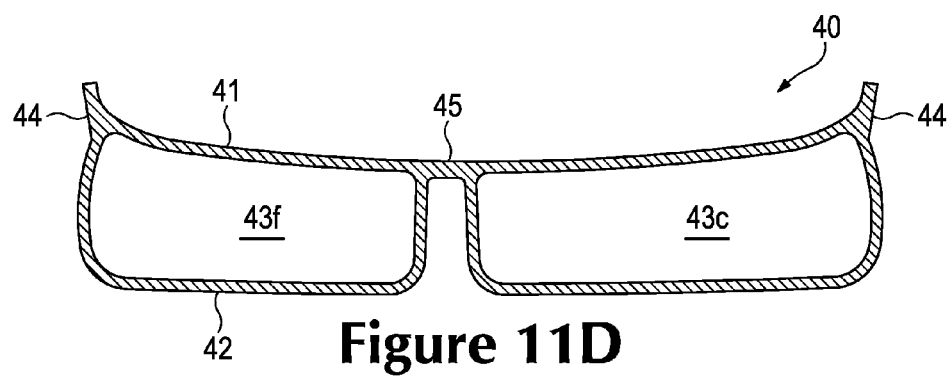
Figure 11E:
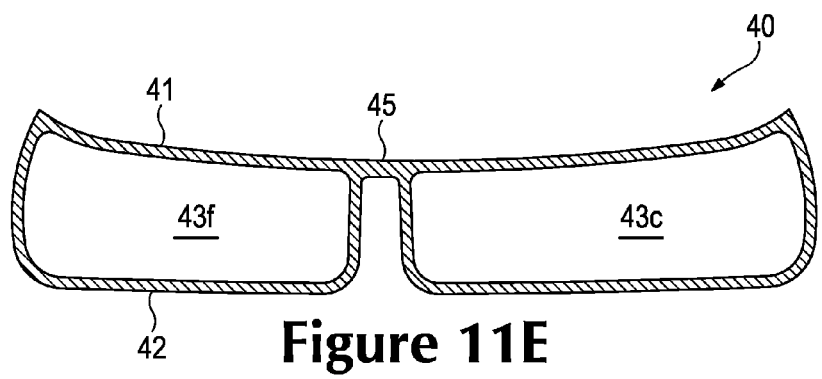
Figure 12:
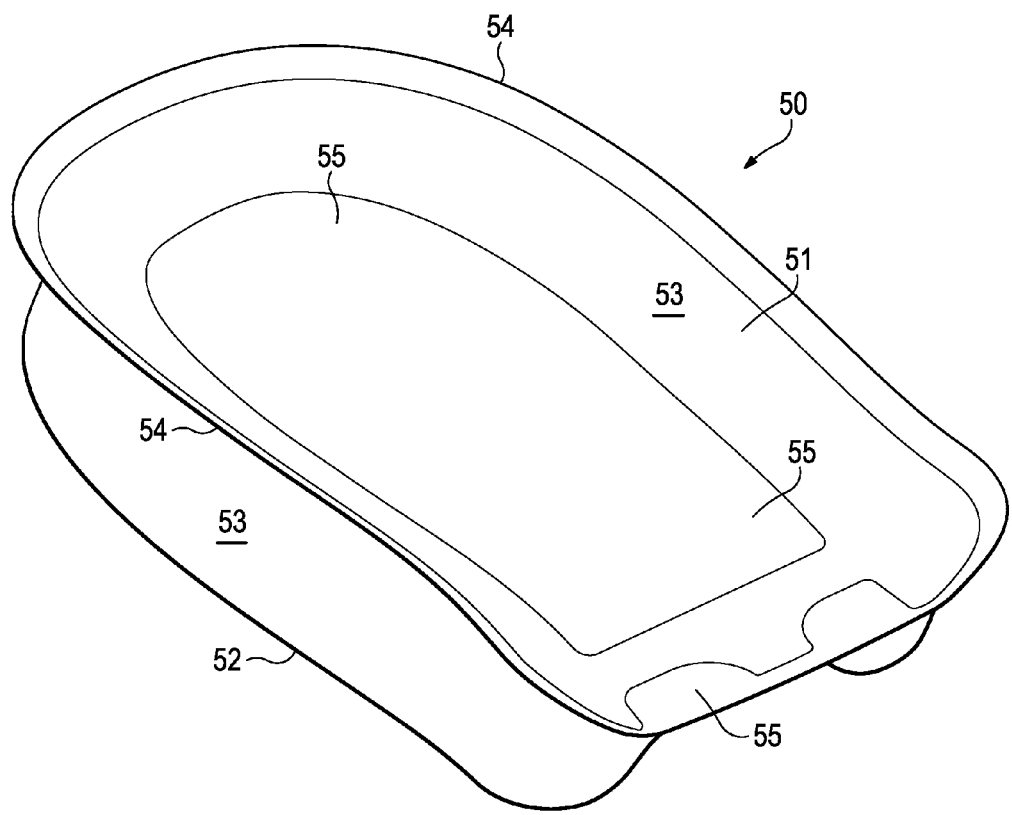
FIG. 12 is a perspective view of a heel component of the sole structure.
Figure 13:
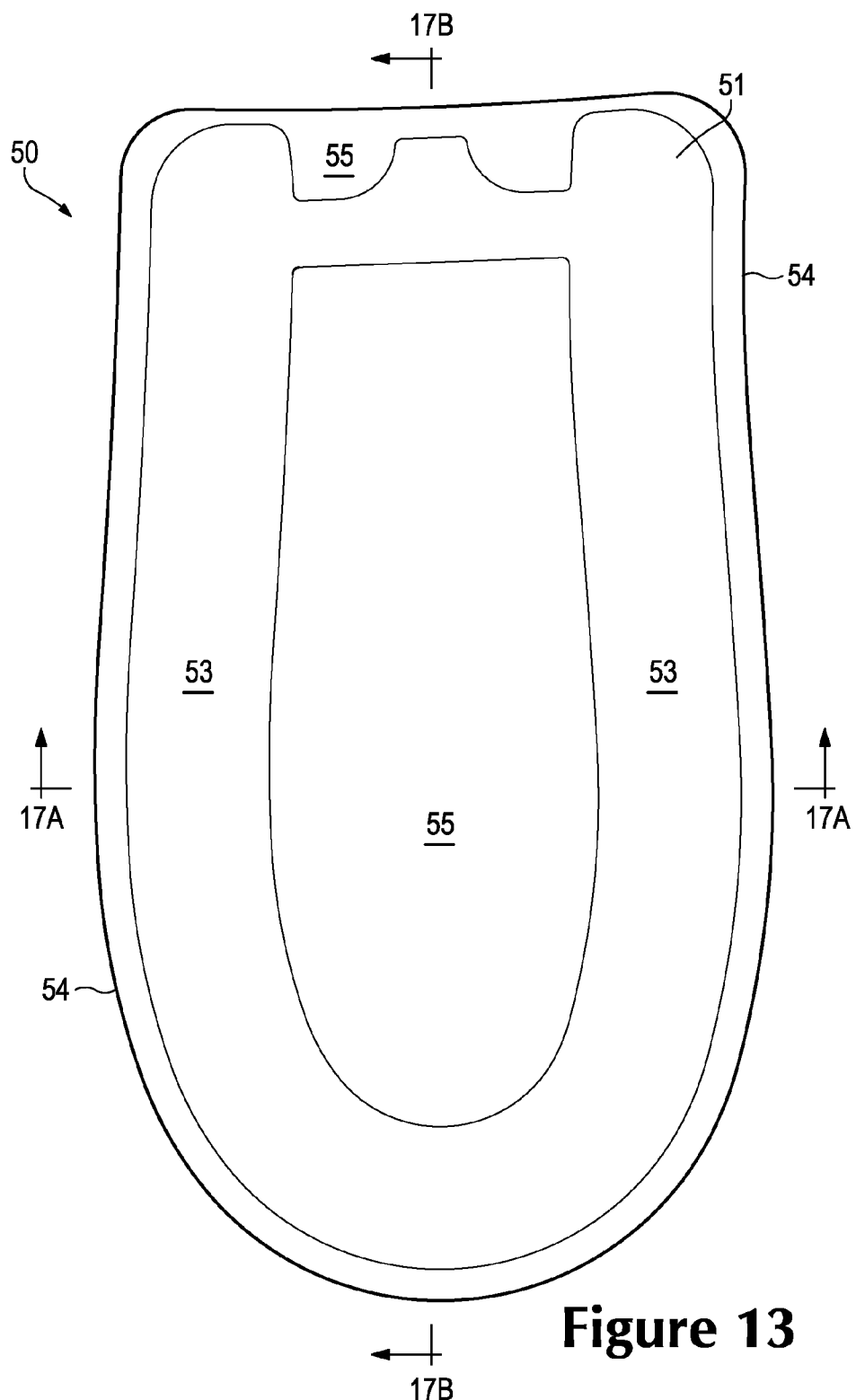
FIG. 13 is a top plan view of the heel component.
Figure 14:
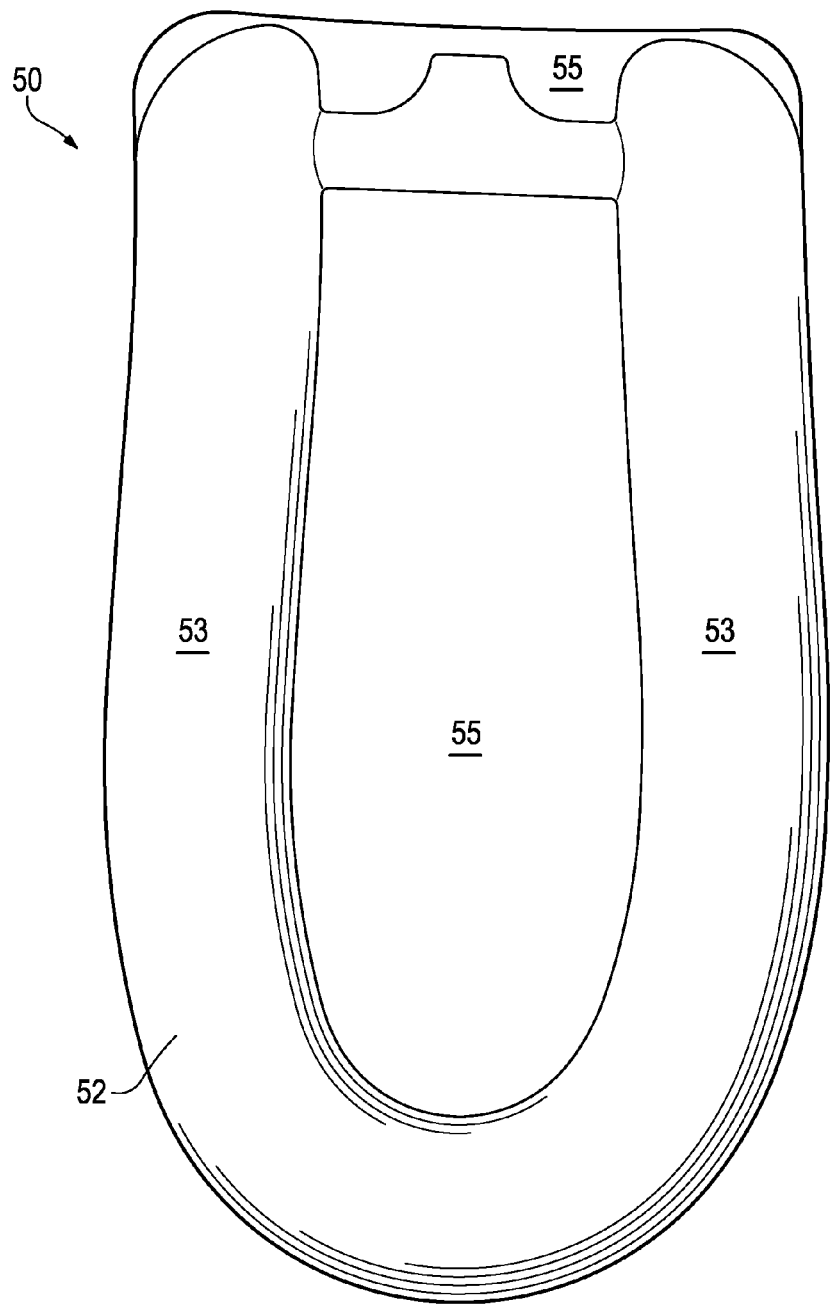
FIG. 14 is a bottom plan view of the heel component.
Figure 15:
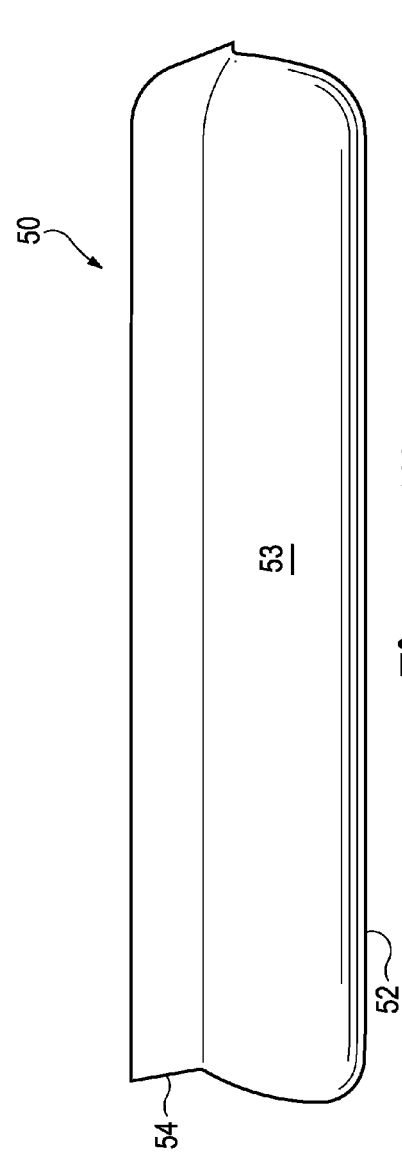
FIG. 15 is a lateral side elevational view of the heel component.
Figure 16:
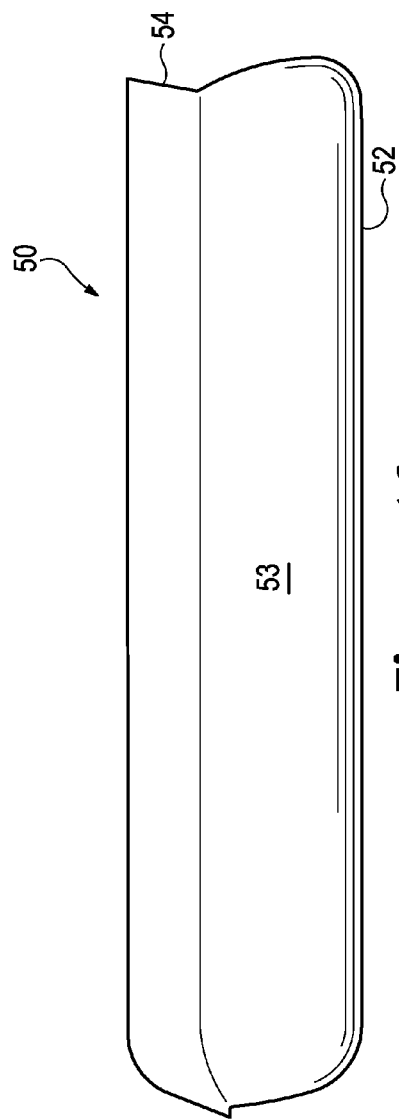
FIG. 16 is a medial side elevational view of the heel component.

In addition to the configurations discussed above, various other aspects of forefoot component 40 may vary. Referring to FIG. 11A, chambers 43c and 43f are depicted as having greater height, whereas FIG. 11B depicts a lesser height. By varying the heights of chambers 43a-43f, the cushioning or force attenuation properties may be modified. Referring to FIG. 11C, a foam element 48 is located between chambers 43c and 43f and in contact with web area 45, which may decrease longitudinal flexibility in sole structure 30 and increase cushioning properties. Aspects relating to flange 44 may also vary. Referring to FIG. 11D, flange 44 has a non-tapered and squared configuration, which may add further stiffness. In FIG. 11E, the structure flange 44 is substantially absent from forefoot component 40.

Heel Component

Heel component 50 is depicted separate from footwear 10 in FIGS. 12-16 and is formed from a polymer material that defines a first or upper surface 51 and an opposite second or lower surface 52. Whereas upper surface 51 is secured to upper 20, different portions of lower surface 52 are either secured to outsole 60 or exposed and visible from an exterior surface of footwear 10. As with forefoot component 40, upper surface 51 and lower surface 52 are formed from polymer layers during a molding or thermoforming process. More particularly, upper surface 51 is formed from one polymer layer, and lower surface 52 is formed from another polymer layer. Any of the polymer materials noted above for forefoot component 40 may also be utilized for the polymer layers forming heel component 50.

Heel component 50 includes a single chamber 53, a flange 54, and a web area 55. Chamber 53 and flange 54 each have a generally U-shaped configuration that, when incorporated into footwear 10, extends (a) along lateral side 14, (b) around a rear portion of heel region 13, and (c) along medial side 15, thereby extending around a peripheral area of heel component 50. Like each of chambers 43a-43f, chamber 53 encloses or contains the fluid within heel component 50 and is formed from separated or spaced areas of the polymer layers forming surfaces 51 and 52. Flange 54 is formed from portions of the polymer layers that are molded and joined together and protrudes outward from chamber 53. Web area 55 extends through a central area of heel component 50 and between lateral and medial portions of chamber 53. Like flange 54, web area 55 is formed from portions of the polymer layers that are joined together. Although adhesive bonding may be utilized in joining the polymer layers in flange 54 and web area 55, thermal bonding may also join the polymer layers during the molding or thermoforming process.

Chamber 53 is the primary component of heel component 50 that encloses the fluid. In areas immediately adjacent to chamber 53, the polymer layers forming surfaces 51 and 52 are joined to each other to form a bond that seals the fluid within heel component 50. More particularly, flange 54 and web area 55 cooperatively bound or otherwise extend around chamber 53 and are formed from areas of the polymer layers that are bonded to each other, thereby sealing the fluid within chamber 53. In further configurations of footwear 10, chamber 53 may be subdivided into two or more subchambers that may be pressurized differently. In other configurations, heel component 50 may be a part of a fluid system that pumps fluid into chamber 53. In still further configurations, the medial and lateral portions may be connected through a central portion of web area 55.

Upper surface 51 has a generally concave configuration, as depicted in FIGS. 17A and 17B, that supports the foot when footwear 10 is worn. As such, the foot effectively rests within the U-shaped configurations of chamber 53 and flange 54. This configuration may provide stability to footwear 10 and ensure that the foot remains properly positioned relative to heel component 50 and other portions of sole structure 30.

Flange 54 forms a peripheral seam or bonded area that joins the polymer layers forming surfaces 51 and 52 and assists with sealing the fluid within heel component 50. In general, flange 54 has a height of at least five millimeters and extends in an outward direction from a remainder of heel component 50. More particularly, flange 54 extends in an upward direction from the peripheral area or an upper area of heel component 50. Whereas the area of flange 54 corresponding with first surface 51 faces toward and is secured to upper 20, the area of flange 54 corresponding with second surface 52 faces away from and forms a portion of an exterior surface of footwear 10. More simply, one surface of flange 54 is secured to upper 20, and the opposite surface of flange 54 faces away from upper 20. Given that flange 54 is a relatively thick and stiff portion of heel component 50, flange 54 may enhance the stability of footwear 10. As with flange 44, flange 54 may provide a defined lasting margin during steps of the manufacturing process that involve bonding upper 20 to heel component 50.

Referring to the cross-sections of FIGS. 17A and 17B, for example, flange 54 is depicted as having a tapered configuration, with the portions of flange 54 located adjacent to chamber 53 having greater thickness than the portions of flange 54 that are spaced from chamber 53. In effect, therefore, flange 54 has a tapered configuration with a first thickness adjacent to the void in chamber 53 and a second thickness spaced away from the void, the first thickness being greater than the second thickness. Moreover, the thickness of the portions of flange 54 located adjacent to the void (i.e., the first thickness) is greater than either of (a) the thickness of web area 45 in the central area of heel component 50 and (b) the sum of the thicknesses of the polymer layers forming surfaces 51 and 52. Although flange 54 is formed from the polymer layers forming surfaces 51 and 52 and web area 55, flange 54 has a greater thickness than both of the polymer layers combined. As noted above, flange 54 is a relatively thick and stiff portion of heel component 50. A portion of the stiffness may be due, therefore, to the greater thickness of flange 54 adjacent to chamber 53.

Web area 55 extends throughout a central area of heel component 50. In this position, web area 55 forms a bonded area that joins the polymer layers forming surfaces 51 and 52 and also assists with sealing the fluid within chamber 53. Whereas chamber 53 protrudes outward to form structures for receiving the fluid within heel component 50, web area 55 exhibits lesser thickness and may provide cushioning or force attenuation through deflecting downward, similar to a trampoline.

Figure 18A:
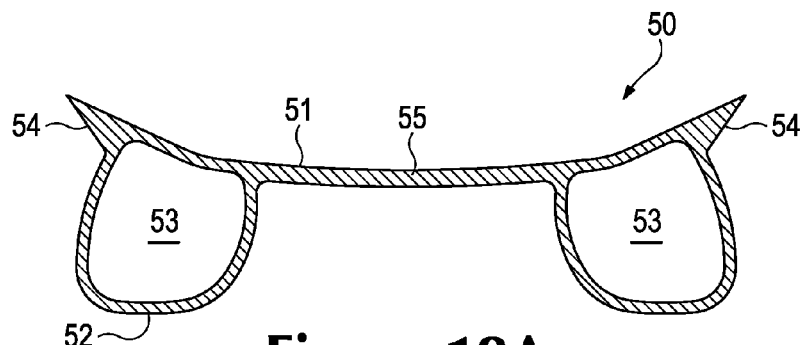
FIGS. 18A-18C are cross-sectional views corresponding with FIG. 17A and depicting further configurations of the heel component.
Figure 18B:
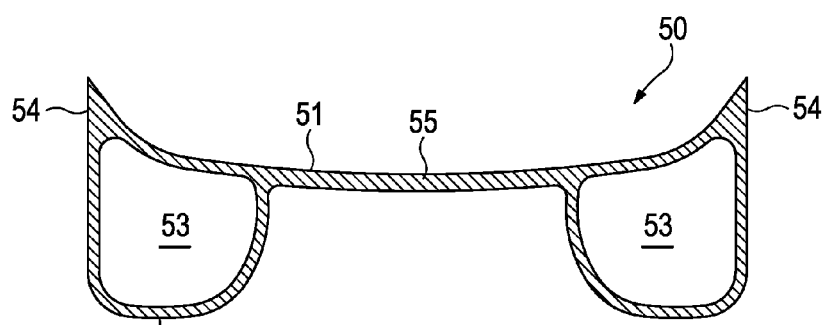
Figure 18C:
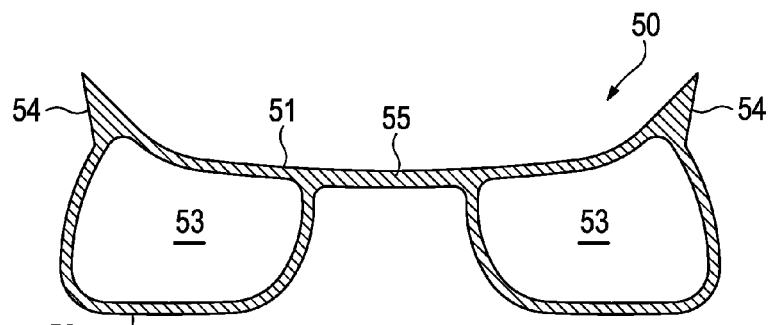

The configuration of heel component 50 discussed above provides one example of a suitable configuration for use in footwear 10 and other products. A variety of other configurations may also be utilized. For example, flange 54 angles outwardly in FIG. 18A, rather than having a vertical orientation. In this configuration, flange 54 may support edges of the foot, rather than extending along sides of the foot. Referring to FIG. 18B, chamber 53 bulges outward to a lesser degree, which locates flange 54 at the immediate periphery of heel component 50 and forms vertical sides for heel component 50. As another example, the width of chamber 53 is increased in FIG. 18C, which may modify the cushioning or force attenuation properties of heel component 50. In other configurations, flange 54 may have a squared aspect or be absent, similar to FIGS. 11D and 11E.

Figure 19A:
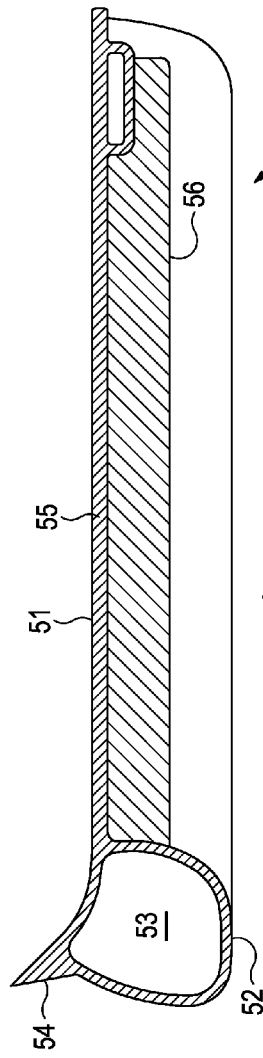
FIGS. 19A-19C are cross-sectional views corresponding with FIG. 17B and depicting further configurations of the heel component.
Figure 19B:
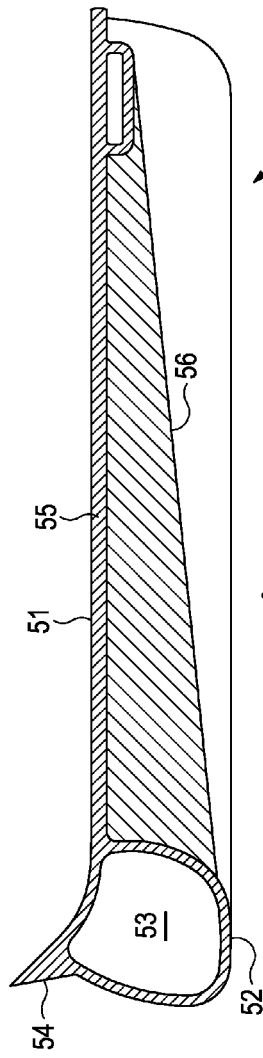
Figure 19C:
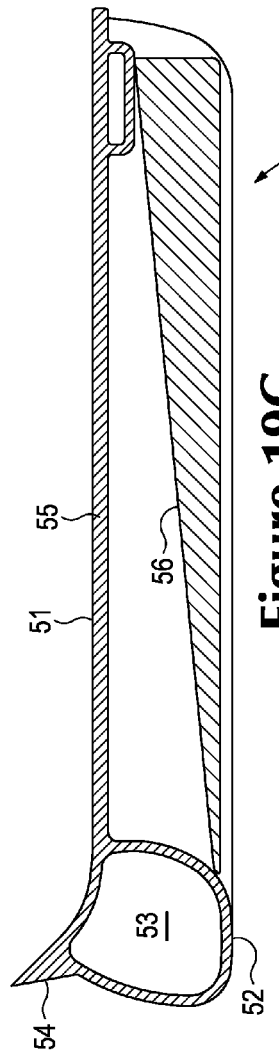

Although the area between opposite sides of chamber 53 and under web area 55 may be open, foam elements or other components may be located in this area. Referring to FIG. 19A, for example, a foam element 56 is located under and in contact with web area 55. Among other aspects, foam element 56 may affect the flexibility or force attenuation properties of heel component 50. Moreover, the shape and location of foam element 56 may also affect properties of heel component 50. Referring to FIG. 19B, foam element 56 has a tapered configuration, which may alter properties between forward and rearward areas of heel component 50. Similarly, foam element 56 is tapered and spaced from web area 55 in FIG. 19C. Accordingly, heel component 50 may vary in many aspects.

Manufacturing Process for Forefoot Component

Figure 20:
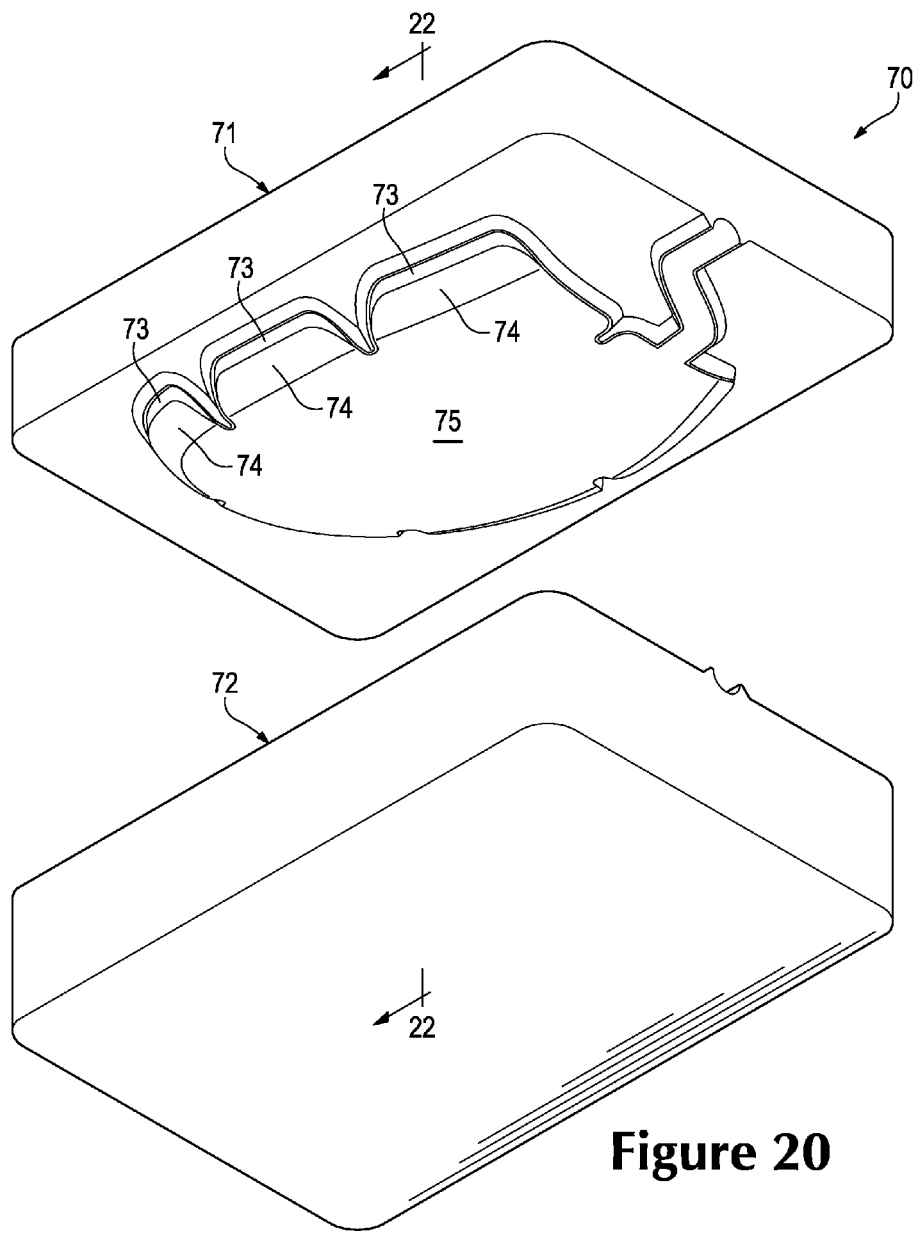
FIGS. 20 and 21 are perspective views of a forefoot component mold.
Figure 21:
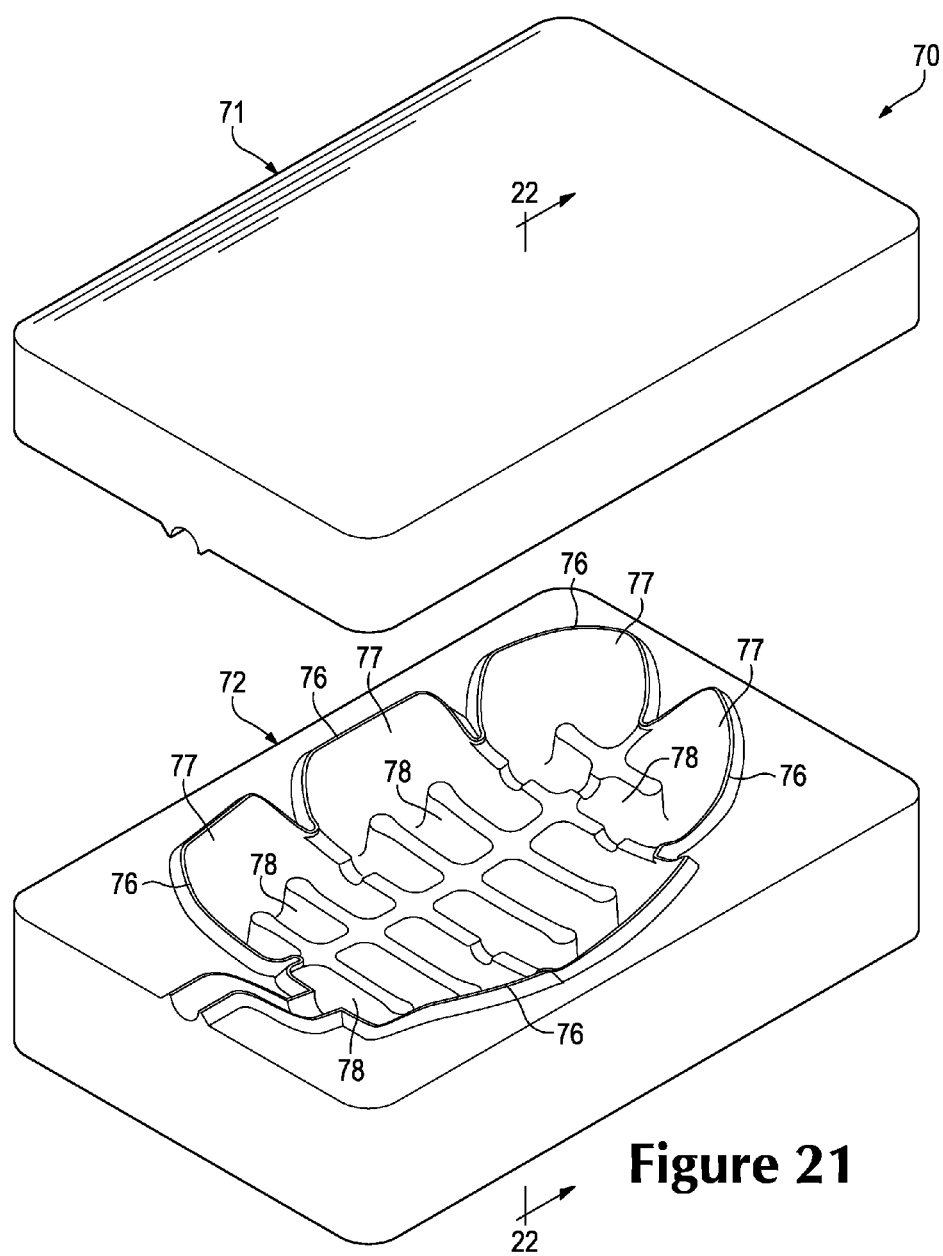

Although a variety of manufacturing processes may be utilized to form forefoot component 40, an example of a suitable process will now be discussed. With reference to FIGS. 20 and 21, a mold 70 that may be utilized in the manufacturing process is depicted as including a first mold portion 71 and a second mold portion 72. As discussed below in reference to FIGS. 22A-22E, mold 70 is utilized to form forefoot component 40 from a first polymer layer 81 and a second polymer layer 82, which are the polymer layers respectively forming first surface 41 and second surface 42. More particularly, mold 70 facilitates the manufacturing process by (a) shaping polymer layers 81 and 82 in areas corresponding with chambers 43a-43f, flange 44, and conduits 46 and (b) joining polymer layers 81 and 82 in areas corresponding with flange 44 and web area 45.

Figure 22A:
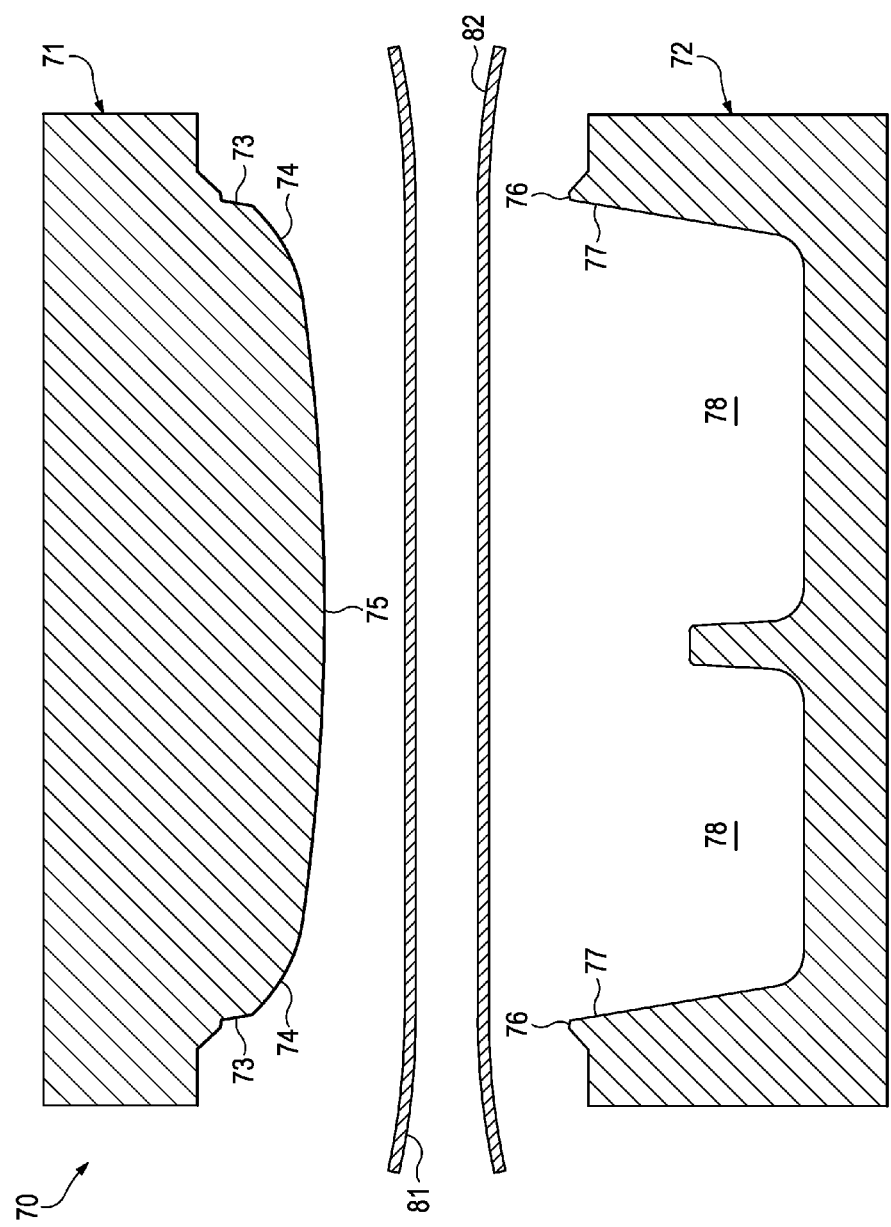
FIGS. 22A-22E are cross-sectional views depicting a manufacturing process for forming the forefoot component utilizing the forefoot component mold, as defined along a section line 22 in FIGS. 20 and 21.

Various surfaces or other areas of mold 70 will now be defined for use in discussion of the manufacturing process. Referring to FIGS. 20 and 22A, first mold portion 71 includes a pinch surface 73, a first seam-forming surface 74, and a compression surface 75. Surfaces 73 and 74 are angled relative to each other, with pinch surface 73 being more vertical than first seam-forming surface 74. Referring to FIGS. 21 and 22A, second mold portion 72 includes a pinch edge 76 and a second seam-forming surface 77. Whereas pinch edge 76 is a relatively sharp corner or angled area in second mold portion 72, second seam-forming surface 77 extends downward and is generally, although not necessarily, parallel to pinch surface 73. A void within mold 70 and between mold portions 71 and 72 has a shape of forefoot component 40, prior to pressurization, and forms various features of forefoot component 40. A portion of this void is identified as a depression 78 in second mold portion 72.

Each of polymer layers 81 and 82 are initially located between each of mold portions 71 and 72, which are in a spaced or open configuration, as depicted in FIG. 22A. In this position, first polymer layer 81 is positioned adjacent or closer to first mold portion 71, and second polymer layer 82 is positioned adjacent or closer to second mold portion 72. A shuttle frame or other device may be utilized to properly position polymer layers 81 and 82. As part of the manufacturing process, one or both of polymer layers 81 and 82 are heated to a temperature that facilitates shaping and bonding. As an example, various radiant heaters or other devices may be utilized to heat polymer layers 81 and 82, possibly prior to being located between mold portions 71 and 72. As another example, mold 70 may be heated such that contact between mold 70 and polymer layers 81 and 82 at a later portion of the manufacturing process raises the temperature to a level that facilitates shaping and bonding.

Figure 22B:
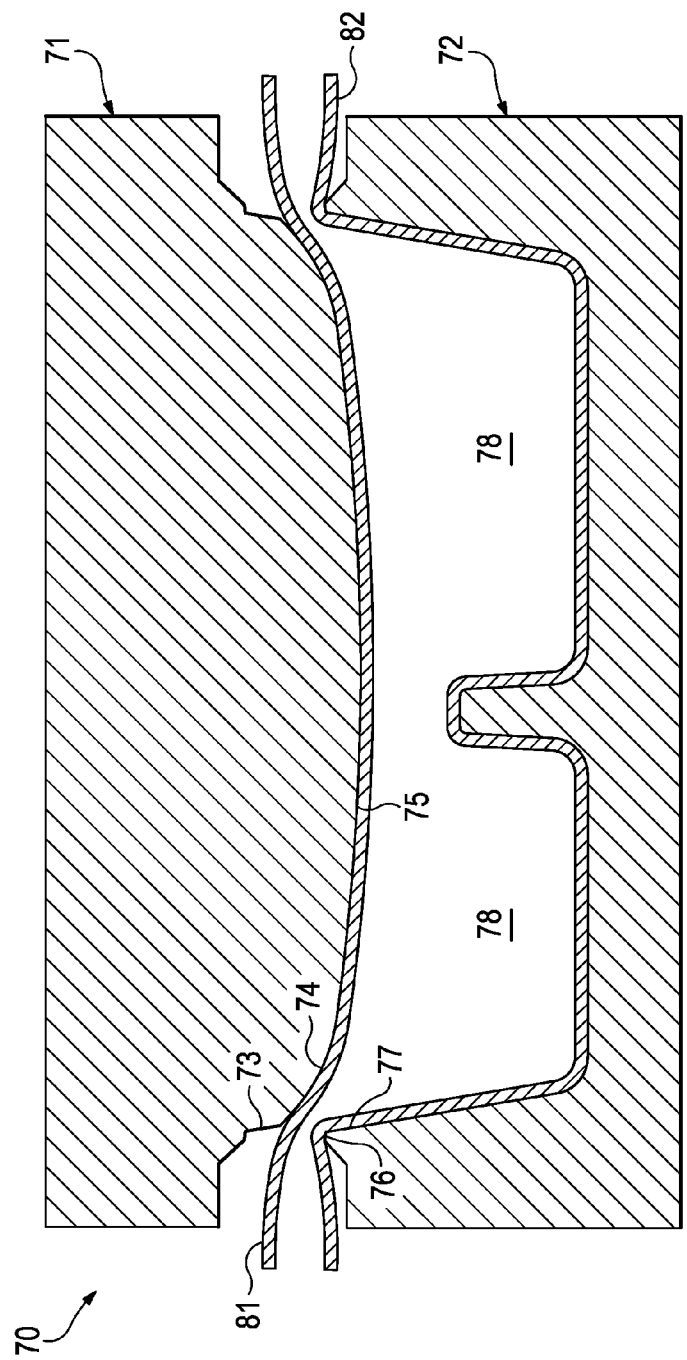

Once polymer layers 81 and 82 are properly positioned, mold portions 71 and 72 translate or otherwise move toward each other and begin to close upon polymer layers 81 and 82, as depicted in FIG. 22B. As mold portions 71 and 72 move toward each other, various techniques may be utilized to draw polymer layers 81 and 82 against surfaces of mold portions 71 and 72, thereby beginning the process of shaping polymer layers 81 and 82. For example, air may be partially evacuated from the areas between (a) first mold portion 71 and first polymer layer 81 and (b) second mold portion 72 and second polymer layer 82. More particularly, air may be withdrawn through various vacuum ports in mold portions 71 and 72. By removing air, polymer layers 81 and 82 are drawn into contact with the surfaces of mold portions 71 and 72. As another example, air may be injected into the area between polymer layers 81 and 82, thereby elevating the pressure between polymer layers 81 and 82. During a preparatory stage of this process, an injection needle may be located between polymer layers 81 and 82, and a gas may then be ejected from the injection needle such that polymer layers 81 and 82 engage the surfaces of mold 70. Each of these techniques may be used together or independently.

Figure 22C:
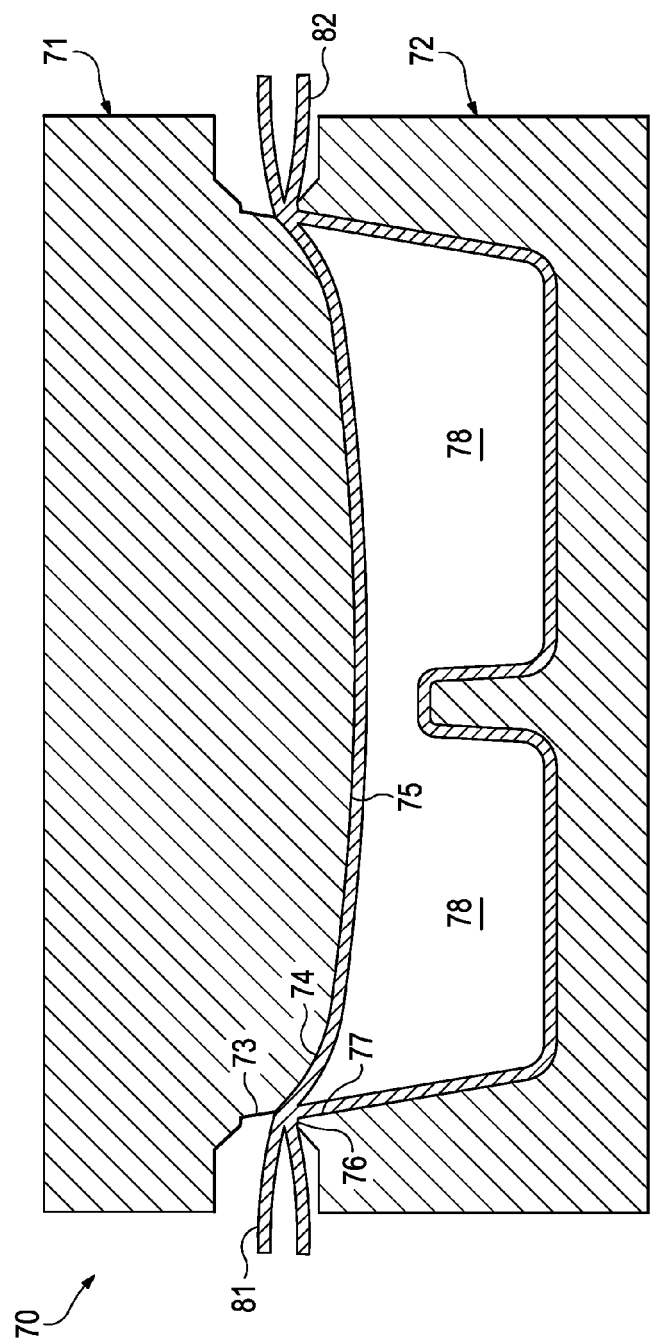

As mold portions 71 and 72 continue to move toward each other, polymer layers 81 and 82 are pinched between mold portions 71 and 72, as depicted in FIG. 22C. More particularly, polymer layers 81 and 82 are compressed between pinch surface 73 and pinch edge 76. In addition to beginning the process of separating excess portions of polymer layers 81 and 82 from portions that form forefoot component 40, the pinching of polymer layers 81 and 82 begins the process of bonding or joining layers 81 and 82 in the area of flange 44.

Figure 22D:
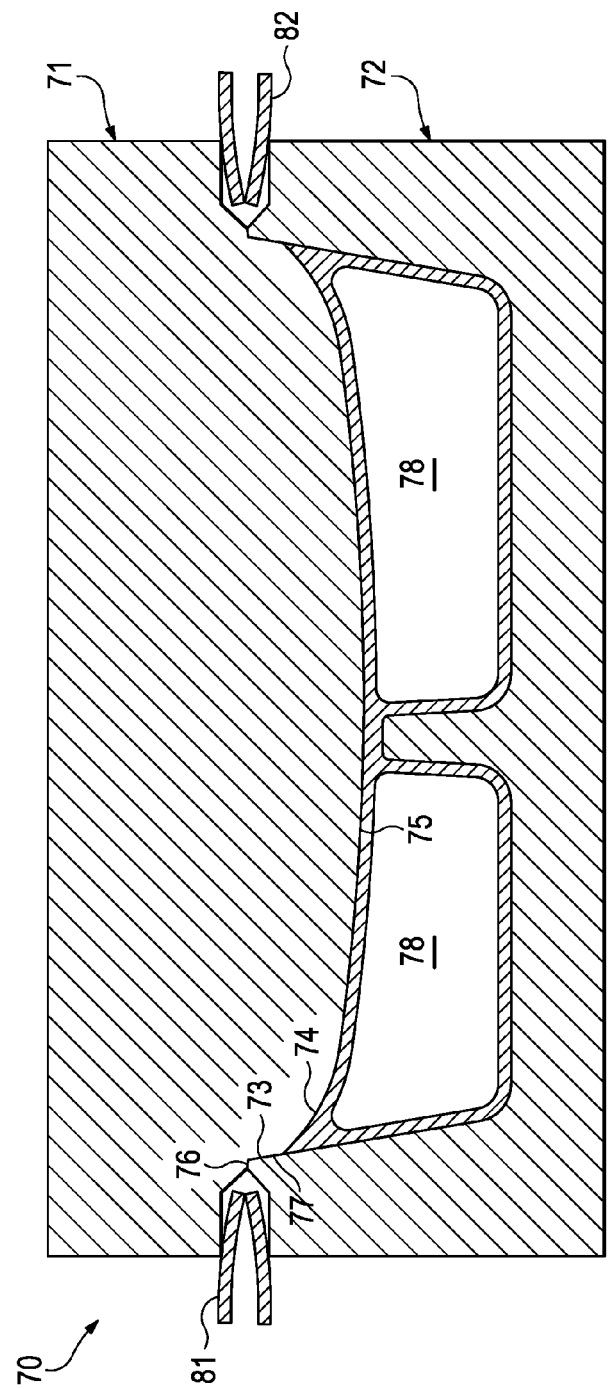

Following the pinching of polymer layers 81 and 82, mold portions 71 and 72 proceed with moving toward each other and into a closed configuration, as depicted in FIG. 22D. In the period between FIGS. 22C and 22D, pinch surface 73 contacts and slides against a portion of second seam-forming surface 77. The contact between pinch surface 73 and second seam-forming surface 77 effectively severs excess portions of polymer layers 81 and 82 from portions that form forefoot component 40. In addition, the sliding movement pushes portions of the material forming polymer layers 81 and 82 downward and further into depression 78. Moreover, the material forming polymer layers 81 and 82 compacts or otherwise collects in the area between seam-forming surfaces 74 and 77. Given that seam-forming surfaces 74 and 77 are angled relative to each other, the compacted polymer material forms a generally triangular or tapered structure, which results in flange 44. In addition to forming flange 44, polymer layers 81 and 82 are (a) shaped to form chambers 43a-43f and (b) compressed and joined to form web area 45.

At the stage of the process depicted in FIG. 22D, a void within mold 70, which is located between compression surface 75 and depression 78, effectively has the shape of forefoot component 40 prior to inflation or pressurization. Moreover, a peripheral portion of the void includes an area that forms flange 44 between seam-forming surfaces 74 and 77. The non-parallel configuration between seam-forming surfaces 74 and 77 results in a tapered space where the polymer material collects to form flange 44. A distance across the space between seam-forming surfaces 74 and 77 is greater adjacent to a portion of the void that forms chambers 43a-43f than in the area where seam-forming surfaces 74 and 77 meet, which is spaced from the portion of the void that forms chambers 43a-43f. Although the configuration of the tapered space between seam-forming surfaces 74 and 77 may vary, an angle formed between seam-forming surfaces 74 and 77 may be in a range of twenty and forty-five degrees.

As discussed above, the material forming polymer layers 81 and 82 compacts or otherwise collects in the area between seam-forming surfaces 74 and 77. This compaction effectively thickens one or both of polymer layers 81 and 82. That is, whereas polymer layers 81 and 82 have a first thickness at the stage depicted in FIG. 22A, one or both of polymer layers 81 and 82 within flange 44 may have a second, greater thickness at the stage depicted in FIG. 22D. The compaction that occurs as pinch surface 73 contacts and slides against a portion of second seam-forming surface 77 increases the thickness of the polymer material forming one or both of polymer layers 81 and 82.

Figure 22E:
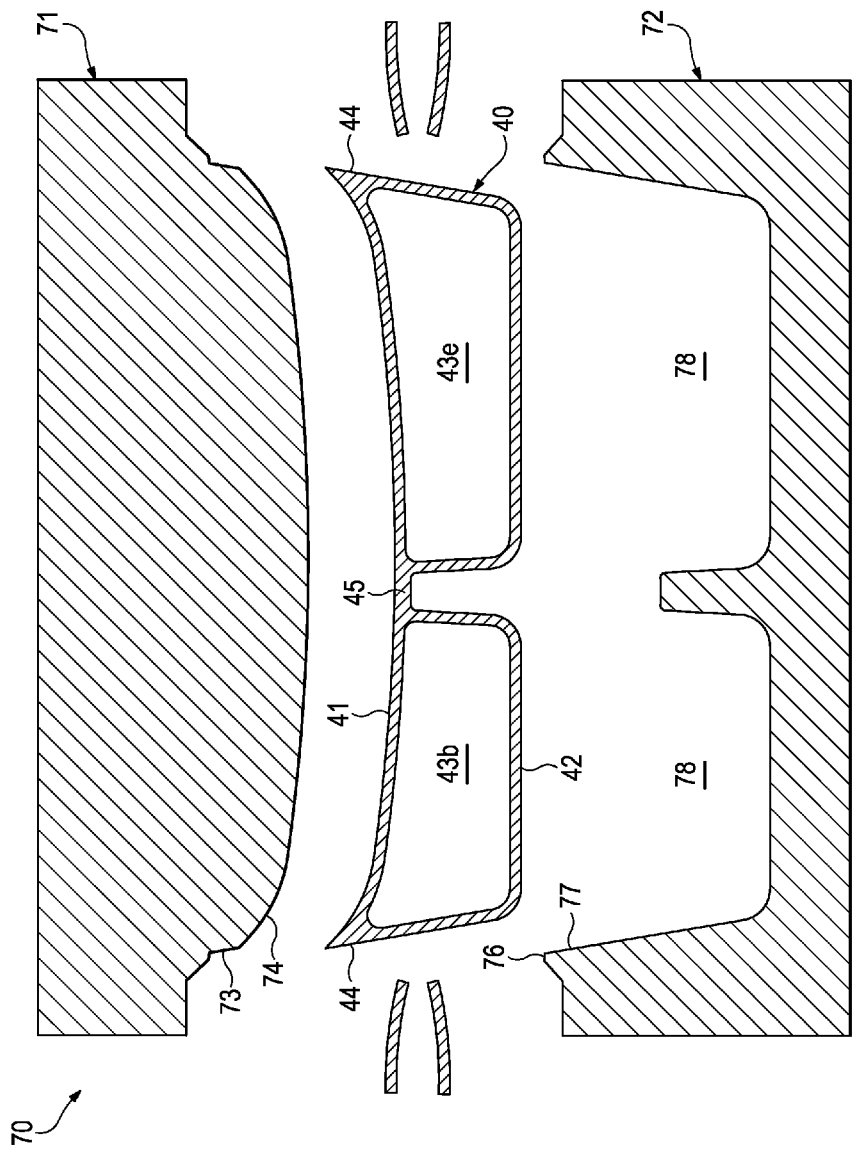

When forming forefoot component 40 is complete, mold 70 is opened and forefoot component 40 is removed and permitted to cool, as depicted in FIG. 22E. A fluid may then be injected into forefoot component 40 to pressurize chambers 43a-43f, thereby completing the manufacture of forefoot component 40. As a final step in the process, forefoot component 40 may be incorporated into sole structure 30 of footwear 10.

Manufacturing Process for Heel Component

Figure 23:
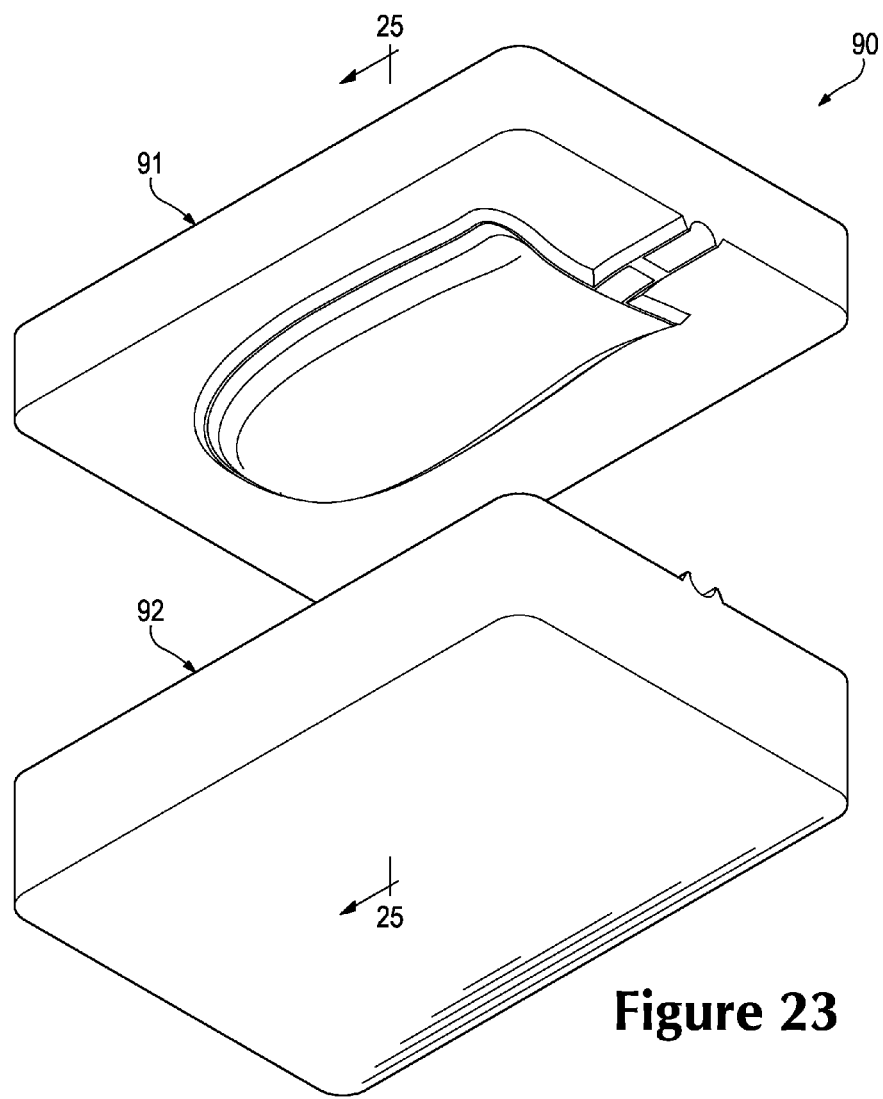
FIGS. 23 and 24 are perspective views of a heel component mold.
Figure 24:
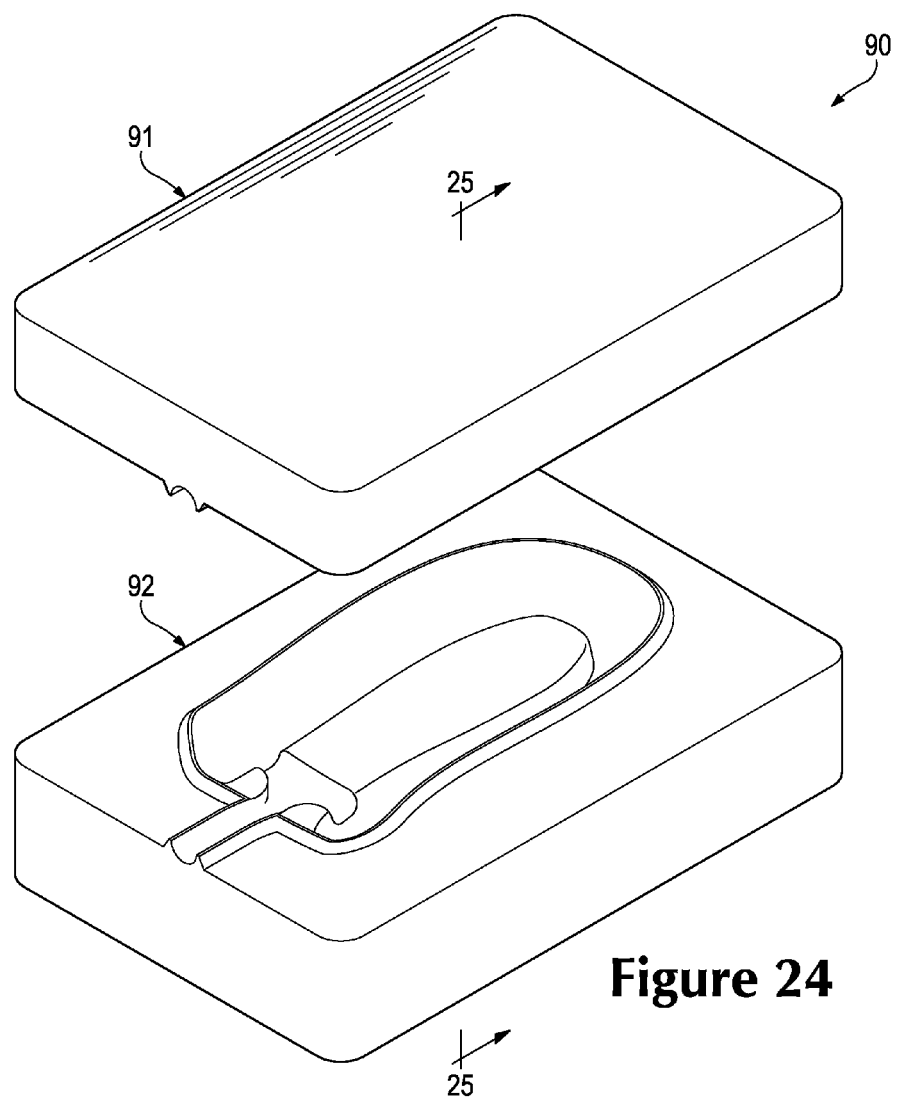

Although a variety of manufacturing processes may be utilized, heel component 50 may be formed through a process that is generally similar to the process discussed above for forefoot component 40. With reference to FIGS. 23 and 24, a mold 90 that may be utilized in the manufacturing process is depicted as including a first mold portion 91 and a second mold portion 92. As discussed below in reference to FIGS. 25A-25D, mold 90 is utilized to form heel component 50 from additional elements of first polymer layer 81 and second polymer layer 82, which are the polymer layers respectively forming first surface 51 and second surface 52. More particularly, mold 90 facilitates the manufacturing process by (a) shaping polymer layers 81 and 82 in areas corresponding with chamber 53 and flange 54 and (b) joining polymer layers 81 and 82 in areas corresponding with flange 54 and web area 55. In addition, mold 90 facilitates the bonding of outsole 60 to heel component 50.

Figure 25A:
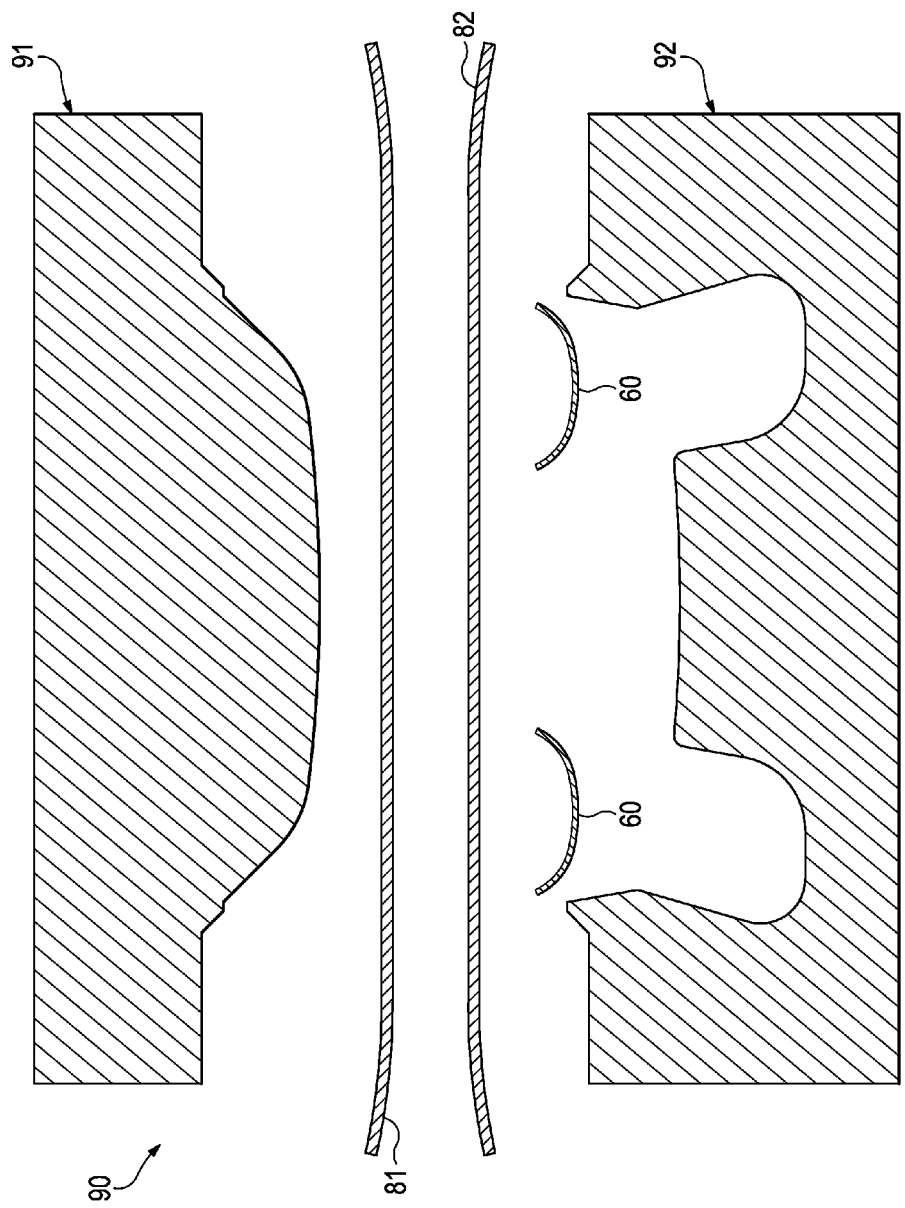
FIGS. 25A-25D are cross-sectional views depicting a manufacturing process for forming the heel component utilizing the heel component mold, as defined along a section line 25 in FIGS. 23 and 24.
Figure 25B:
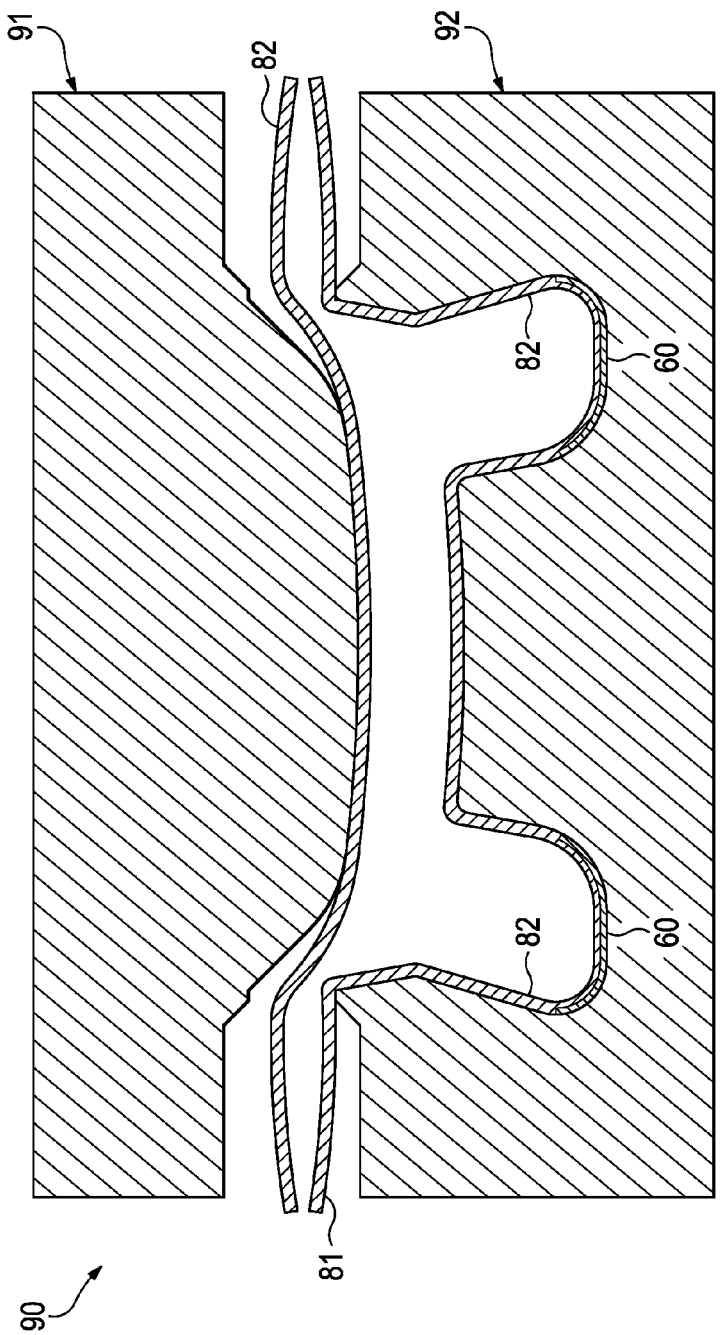

Each of polymer layers 81 and 82 are initially located between each of mold portions 91 and 92, as depicted in FIG. 25A. In addition, one or more elements that form outsole 60 are also located relative to mold 90. Once polymer layers 81 and 82 are properly positioned and the elements of outsole 60 are located within depressions in second mold portion 91, mold portions 91 and 92 translate or otherwise move toward each other and begin to close upon polymer layers 81 and 82, as depicted in FIG. 25B. As discussed above, air may be partially evacuated from the areas between (a) first mold portion 91 and first polymer layer 81 and (b) second mold portion 92 and second polymer layer 82. Additionally, air may be injected into the area between polymer layers 81 and 82. Using one or both of these techniques, polymer layers 81 and 82 are induced to engage the surfaces of mold 90. Additionally, polymer layers 81 and 82 also lay against outsole 60. In effect, therefore, polymer layers 81 and 82 are shaped against surfaces of mold 90 and outsole 60.

Figure 25C:
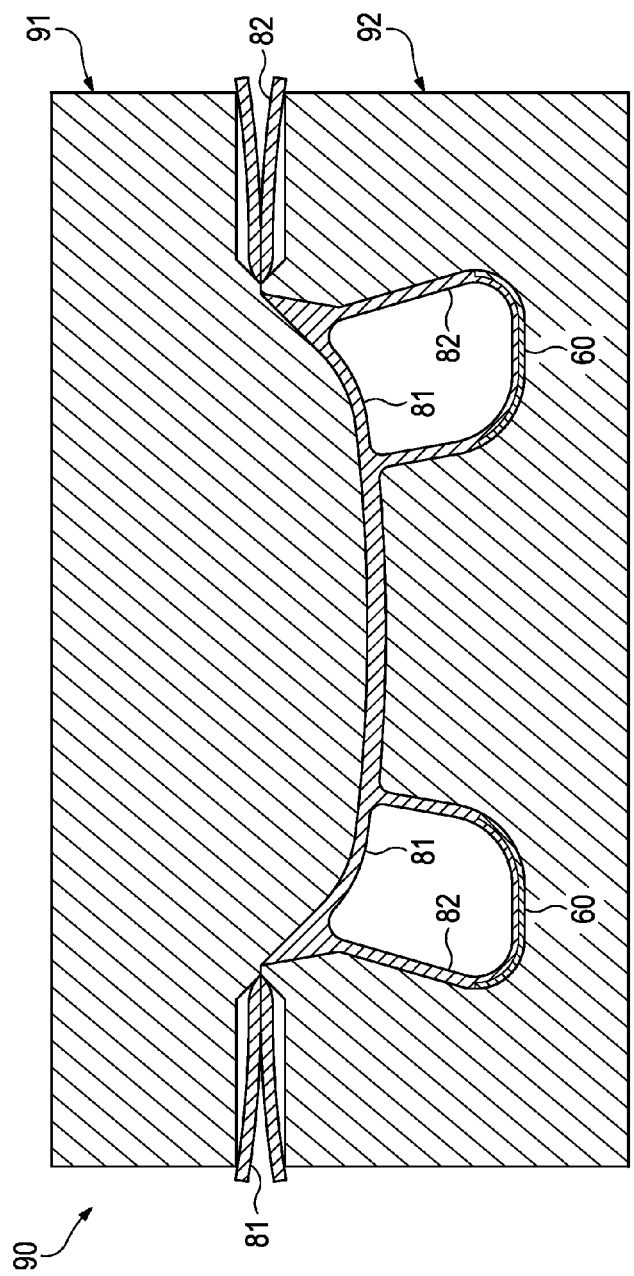

As mold portions 91 and 92 continue to move toward each other, polymer layers 81 and 82 are compressed between mold portions 91 and 92, as depicted in FIG. 25C. More particularly, polymer layers 81 and 82 are compressed to form flange 54 and web area 55. Polymer layer 82 also bonds with outsole 60. In some configurations, outsole 60 may be thermal bonded to heel component 50 during the manufacturing process. For example, when each of polymer layer 82 and outsole 60 are formed from similar or compatible polymer materials, or when outsole 60 is at least partially formed from the polymer material of chamber 53, heating of the components may induce thermal bonding between the components.

Figure 25D:
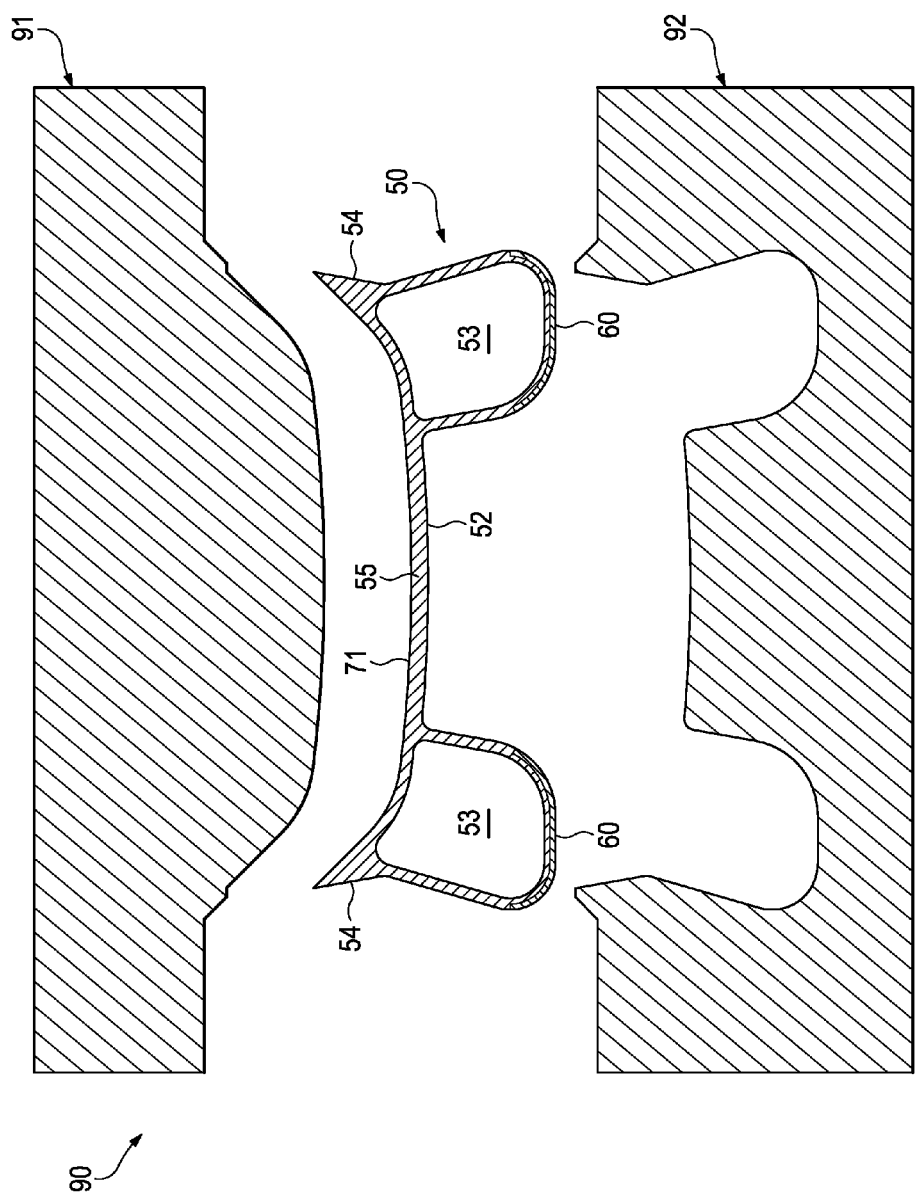

When forming heel component 50 is complete, mold 90 is opened and heel component 50 is removed and permitted to cool, as depicted in FIG. 25D. A fluid may then be injected into heel component 50 to pressurize chamber 53, thereby completing the manufacture of heel component 50. As a final step in the process, heel component 50 may be incorporated into sole structure 30 of footwear 10.

As polymer layers 81 and 82 are drawn into mold 90, particularly the larger depressions in second mold portion 91, polymer layers 81 and 82 stretch to conform with the contours of mold 90. When polymer layers 81 and 82 stretch, they also thin or otherwise decrease in thickness. Accordingly, the initial thicknesses of polymer layers 81 and 82 may be greater than the resulting thicknesses after the manufacturing process.

Figure 26A:
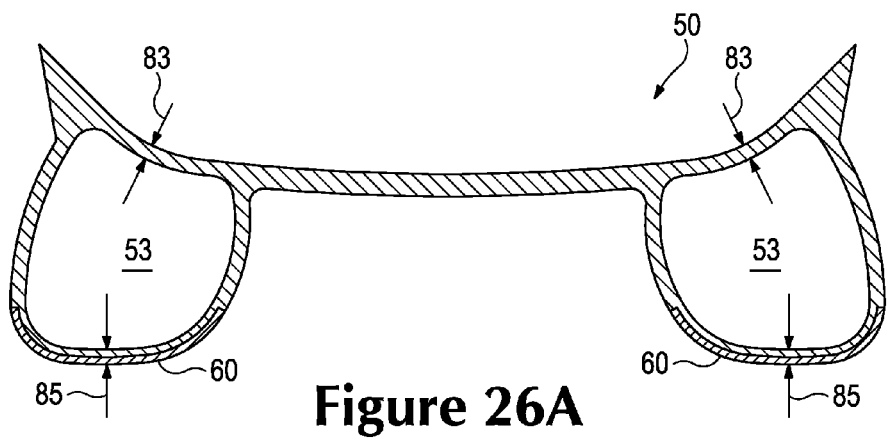
FIG. 26A is a cross-sectional view corresponding with FIG. 17A and depicting another configuration of the heel component.
Figure 26B:
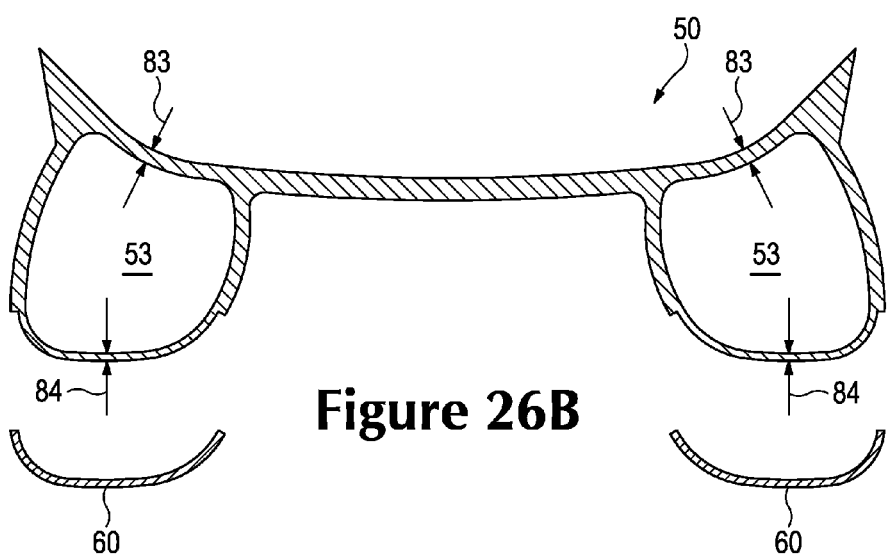
FIG. 26B is an exploded cross-sectional view of the configuration from FIG. 26A.

Referring to FIGS. 26A and 26B, various thickness dimensions 83, 84, and 85 are defined. Thickness dimension 83 is measured in an upper area of chamber 53 and between an exterior surface of chamber 53 and an interior surface of chamber 53, which defines the void. Thickness dimension 84 is measured in a lower area of chamber 53 and between the exterior and interior surfaces of chamber 53. Thickness dimension 85 is measured in the same place as thickness dimension 84 and between an outer surface of outsole 60 and the interior surface of chamber 53.

For footwear applications, as noted above, a polymer thickness of 0.75 millimeter (0.03 inch) and a fluid pressure of 138 kilopascals (20 pounds per square inch) provides a suitable degree of compliance, force attenuation, and other properties. Polymer thicknesses of less than 0.75 millimeter may rupture or otherwise fail prematurely or after repeated use. The manufacturing processes for many chambers are designed, therefore, to ensure that the polymer thickness remains at or above 0.75 millimeter. In the manufacturing process for heel component 50, however, the relatively deep depressions in second mold portion 92 may result in thinning of second polymer layer 82 that is below the 0.75 millimeter threshold. That is, second polymer layer 82 may thin to a degree that makes heel component susceptible to rupturing. The bonding of outsole 60 to heel component 50, however, effectively thickens and reinforces the lower area of heel component 50.

Given the above discussion, thickness dimension 83 may be approximately 0.75 millimeter and thickness dimension 84 may be less than 0.75 millimeter, and possibly less than 0.50 millimeter (0.02 inch) or more than fifty percent less than thickness dimension 83. The addition of outsole 60 increases the thickness in the lower area of heel component 50, and generally increases the thickness to more than 0.75 millimeter. As such, thickness dimension 83 may be (a) more than thickness dimension 84 and (b) less than thickness dimension 85. Moreover, designing heel component 50 such that thickness dimension 85 is greater than thickness dimension 83 ensures that outsole 60 may wear from contact with the ground.

In addition to providing a wear surface in footwear 10, outsole 60 may enhance various properties of sole structure 30. The thickness, flexibility, and stretch of outsole 60, for example, may be varied or selected to modify or otherwise tune the cushioning response, flexibility, compressibility, and other properties of sole structure 30. Ribs, apertures, or other features of outsole 60 may also affect the resulting properties of sole structure 30. Outsole 60 may also incorporate tread elements (e.g., protrusions, ridges) that imparts traction. Regarding aesthetics, outsole 60 may be colored, clear, or patterned to enhance the visual appeal of footwear 100. In some configurations, outsole 60 may be replaced by a plate or other structural element in the manufacturing process discussed above. In addition to modifying the properties of sole structure 30, a plate may have features that assist with securing an outsole or other element to heel component 50.

The invention is disclosed above and in the accompanying figures with reference to a variety of configurations. The purpose served by the disclosure, however, is to provide an example of the various features and concepts related to the invention, not to limit the scope of the invention. One skilled in the relevant art will recognize that numerous variations and modifications may be made to the configurations described above without departing from the scope of the present invention, as defined by the appended claims.

The invention claimed is:

1. An article of footwear having an upper and a sole structure secured to the upper, the sole structure comprising a component formed from a first polymer layer and a second polymer layer, the component including a chamber with an interior void that encloses a fluid, at least a portion of the component including a flange that forms a seam for joining the first polymer layer and the second polymer layer and sealing the fluid within the void, the flange extending in an outward direction from the void and having a tapered configuration with a first thickness adjacent to the void and a second thickness spaced away from the void, the first thickness being greater than the second thickness, the chamber including a first group of subchambers located adjacent to a lateral side of the article of footwear and a second group of subchambers located adjacent to a medial side of the article of footwear, the first group of subchambers having at least two parallel segments extending away from the lateral side toward the medial side and the second group of subchambers having at least two parallel segments extending away from the medial side toward the lateral side, the first group of subchambers and the second group of subchambers bounded by a web area where the first polymer layer and the second polymer layer are bonded together, the web area extending between the at least two parallel segments of the first group of subchambers and between the at least two parallel segments of the second group of subchambers.

2. The article of footwear recited in claim 1, wherein a surface of the flange is secured to the upper.

3. The article of footwear recited in claim 1, wherein the flange extends in an upward direction from a peripheral area of the component.

4. The article of footwear recited in claim 1, wherein the flange extends in an upward direction from an upper area of the component.

5. The article of footwear recited in claim 1, wherein the flange is located in a peripheral area of the component, the first thickness being greater than a sum of a thickness of the first polymer layer and a thickness of the second polymer layer in a central area of the component.

6. The article of footwear recited in claim 1, wherein the flange has a U-shaped configuration that extends (a) along a lateral side of the article of footwear, (b) around a rear portion of a heel region of the article of footwear, and (c) along a medial side of the article of footwear.

7. The article of footwear recited in claim 1, wherein a distance across one of the subchambers and between spaced portions of the web area is less than fourteen millimeters.

8. The article of footwear recited in claim 1, wherein the first polymer layer and the second polymer layer are bonded together to define the web area that is spaced inward from the flange, and a distance across the void and between spaced portions of the web area is less than fourteen millimeters.

9. The article of footwear recited in claim 1, wherein the flange has a first surface formed from the first polymer layer and a second surface formed from the second polymer layer, the first surface being secured to the upper, and the second surface facing away from the upper and forming a portion of an exterior surface of the article of footwear.

10. The article of footwear recited in claim 1, wherein the chamber has a first area that faces the upper and an opposite second area that faces away from the upper and toward a ground-engaging surface of the article of footwear, the polymer material having a first thickness in the first area of the chamber and a second thickness in the second area of the chamber, the first thickness of the first area and the second thickness of the second area being measured between an exterior surface of the chamber and an interior surface of the chamber that defines the void, and the first thickness of the first area being greater than the second thickness of the second area.

11. The article of footwear recited in claim 10, wherein the first thickness of the first area is at least fifty percent greater than the second thickness of the second area.

12. The article of footwear recited in claim 10, wherein the first area has a thickness of at least 0.75 millimeter (0.03 inch) and the second area has a thickness less than 0.50 millimeter (0.02 inch).

13. The article of footwear recited in claim 10, further comprising an outsole layer thermal bonded to the second area of the chamber and forming at least a portion of a ground-engaging surface of the article of footwear.

14. The article of footwear recited in claim 13, wherein a third thickness measured between the outer surface of the outsole layer and the interior surface of the chamber is greater than the first thickness.

15. The article of footwear recited in claim 1, wherein the first group of subchambers are in fluid communication with one another by a subchamber extending along the lateral side of the article of footwear and substantially perpendicular to the at least two parallel segments of the first group of subchambers.

16. The article of footwear recited in claim 15, wherein the second group of subchambers are in fluid communication with one another by a subchamber extending along the medial side of the article of footwear and substantially perpendicular to the at least two parallel segments of the second group of subchambers.

17. The article of footwear of claim 1, wherein the web area includes a portion that extends along a longitudinal axis of the chamber and separates the first group of subchambers from the second group of subchambers.

18. The article of footwear recited in claim 1, wherein at least one of the first group of subchambers and the second group of subchambers includes a substantially C-shape.

19. The article of footwear recited in claim 1, wherein at least one of the first group of subchambers and the second group of subchambers includes a substantially E-shape.

* * * * *